(12) United States Patent
Hyde et al.

(10) Patent No.: US 7,505,649 B2
(45) Date of Patent: Mar. 17, 2009

(54) PLASMON ROUTER

(75) Inventors: Roderick A. Hyde, Livermore, CA (US); Edward K. Y. Jung, Bellevue, WA (US); Nathan P. Myhrvold, Medina, WA (US); John Brian Pendry, London (GB); Clarence T. Tegreene, Bellevue, WA (US); Lowell L. Wood, Jr., Bellevue, WA (US)

(73) Assignee: Searete LLC

( * ) Notice: Subject to any disclaimer, the term of this patent is extended or adjusted under 35 U.S.C. 154(b) by 48 days.

(21) Appl. No.: 11/881,402

(22) Filed: Jul. 25, 2007

(65) Prior Publication Data

US 2008/0024784 A1 Jan. 31, 2008

Related U.S. Application Data

(63) Continuation-in-part of application No. 11/471,288, filed on Jun. 19, 2006, now Pat. No. 7,366,373, and a continuation-in-part of application No. 11/649,710, filed on Jan. 4, 2007, now Pat. No. 7,379,634.

(51) Int. Cl.
*G02B 6/42* (2006.01)
*G02F 1/295* (2006.01)

(52) U.S. Cl. .................... 385/30; 385/8; 385/9

(58) Field of Classification Search ............ 385/30, 385/8, 9
See application file for complete search history.

(56) References Cited

U.S. PATENT DOCUMENTS

| | | | |
|---|---|---|---|
| 5,825,799 A | 10/1998 | Ho et al. | |
| 6,163,637 A | 12/2000 | Zirngibl | |
| 6,437,887 B1 * | 8/2002 | Usami et al. | 359/108 |
| 6,539,156 B1 * | 3/2003 | Dickson et al. | 385/129 |
| 6,614,960 B2 * | 9/2003 | Berini | 385/39 |
| 6,741,782 B2 * | 5/2004 | Berini | 385/130 |
| 6,862,396 B2 * | 3/2005 | Dickson et al. | 385/141 |
| 6,956,651 B2 * | 10/2005 | Lackritz et al. | 356/445 |
| 7,043,134 B2 * | 5/2006 | Berini et al. | 385/147 |
| 7,286,221 B2 * | 10/2007 | Caracci et al. | 356/300 |
| 2002/0131667 A1 * | 9/2002 | Berini | 385/11 |
| 2003/0042487 A1 * | 3/2003 | Sarychev et al. | 257/53 |
| 2003/0059147 A1 * | 3/2003 | Berini | 385/2 |
| 2003/0147616 A1 * | 8/2003 | Dickson et al. | 385/129 |
| 2004/0008943 A1 * | 1/2004 | Berini | 385/39 |
| 2004/0046963 A1 * | 3/2004 | Lackritz et al. | 356/445 |
| 2005/0058425 A1 * | 3/2005 | Berini et al. | 385/147 |
| 2005/0249667 A1 * | 11/2005 | Tuszynski et al. | 424/9.3 |
| 2005/0275934 A1 * | 12/2005 | Ballato et al. | 359/321 |
| 2006/0072875 A1 * | 4/2006 | Bhagavatula et al. | 385/30 |
| 2006/0145326 A1 * | 7/2006 | Tran | 257/680 |
| 2006/0205092 A1 * | 9/2006 | Lackritz et al. | 436/525 |

(Continued)

OTHER PUBLICATIONS

Atwater, Harry A.; Maier, Stefan; Polman, Albert; Dionne, Jennifer A.; Sweatlock, Luke; "The New "p-n Junction": Plasmonics Enables Photonic Access to the Nanoworld"; MRS Bulletin; Bearing a date of May 2005; pp. 385-389; vol. 30; located at: www.mrs.org/publications/bulletin; printed on May 12, 2006.

(Continued)

*Primary Examiner*—K. Cyrus Kianni

(57) ABSTRACT

A variety of structures, methods, systems, and configurations can support plasmons for routing.

21 Claims, 32 Drawing Sheets

U.S. PATENT DOCUMENTS

2006/0260674 A1* 11/2006 Tran .......................... 136/252
2008/0024784 A1* 1/2008 Hyde et al. ................. 356/445
2008/0083881 A1* 4/2008 Gorrell et al. ............... 250/399

OTHER PUBLICATIONS

Barnes, William L.; Dereux, Alain; Ebbesen, Thomas W.; "Surface Plasmon Subwavelength Optics"; Nature: Insight Review Articles; Bearing dates of 2003 and Aug. 14, 2003; pp. 824-830; vol. 424; Nature Publishing Group.

Boltasseva, Alexandra; Nikolajsen, Thomas; Leosson, Kristjan; Kjaer, Kasper; Larsen, Morten S.; Bozhevolnyi, Sergey I.; "Integrated Optical Components Utilizing Long-Range Surface Plasmon Polaritons"; Journal of Lightwave Technology; Bearing dates of May 21, 2004, 2005 and Jan. 2005; pp. 413-422; vol. 23, No. 1; IEEE.

Bozhevolnyi, Sergey I.; Volkov, Valentyn S.; Devaux, Eloise; Laluet, Jean-Yves; Ebbesen, Thomas W.; "Channel Plasmon Subwavelenght Waveguide Components Including Interferometers And Ring Resonators"; Nature—Letters; Bearing dates of Mar. 2006 and 2006; pp. 508-511; vol. 440, No. 23; Nature Publishing Group.

Bozhevolnyi, Dr. Sergey I.; Shalaev, Vladimir M.; "Nanophotonics With Surface Plasmons—Part I"; Photonics Spectra; Bearing a date of Jan. 2006; pp. 58-66 [7 total pages included—some intervening advertisement pages intentionally omitted].

Brongersma, Mark L.; Hartman, John W.; Atwater, Harry A.; "Electromagnetic Energy Transfer and Switching in Nanoparticle Chain Arrays Below The Diffraction Limit"; Rapid Communications—Physical Review B; Bearing dates of Sep. 27, 2000 and Dec. 15, 2000 and 2000; pp. R16356-R16359; vol. 62, No. 24; The American Physical Society.

Kik, Pieter G.; Martin, Andrea L.; Maier, Stefan A.; Atwater, Harry A.; "Metal Nanoparticle Arrays for Near Field Optical Lithography"; Properties of Metal Nanostructures; bearing a date of 2002; pp. 7-13; Proceedings of SPIE; vol. 4810.

Kittel, Charles; "Introduction to Solid State Physics"; Bearing dates of 2000-2004, Nov. 2004 and 2005-2006; pp. 1-704; 8th Edition, ISBN: 0-471-41526-X; John Wiley & Sons, Inc.

Krasavin, A.V.; Zayats, A.V.; Zheludev, N.I.; "Active Control of Surface Plasmon—Polariton Waves"; Journal of Optics A: Pure And Applied Optics; Bearing dates of Jun. 1, 2004, Oct. 19, 2004, Jan. 20, 2005, and 2005; pp. S85-S89; vol. 7, IOP Publishing Ltd.

Leroux, Yann R.; Lacroix, Jean Christophe; Chane-Ching, Kathleen I.; Fave, Claire; Félidj, Nordin; Lévi, Georges; Aubard, Jean, Krenn, Joachim R.; Hohenau, Andreas; "Conducting Polymer Electrochemical Switching as an Easy Means for Designing Active Plasmonic Devices"; J.AM. Chem. Soc.; Bearing dates of Jul. 22, 2005 and 2005; pp. 16022-16023; vol. 127; No. 46; American Chemical Society.

Maier, Stefan A.; Barclay, Paul E.; Johnson, Thomas J.; Friedman, Michelle D.; Painter, Oskar; "Low-Loss Fiber Accessible Plasmon Waveguide for Planar Energy Guiding and Sensing"; Applied Physics Letters; Bearing dates of Dec. 1, 2003, 2004, Mar. 22, 2004, May 3, 2004 and May 17, 2004; pp. 3990-3992; vol. 84, No. 20; American Institute of Physics.

Panoiu, N.-C.; Osgood, R.M., Jr.; "Subwavelength Nonlinear Plasmonic Nanowire"; Nano Letters; Bearing dates of 2004, Sep. 17, 2004, Oct. 21, 2004, and Nov. 10, 2004; pp. 2427-2430; vol. 4, No. 12; American Chemical Society.

Salerno, M.; Krenn, J.R.; Lamprecht, B.; Schider, G.; Ditlbacher, H.; Félidj, N.; Leitner, A.; Aussenegg, F.R.; "Plasmon Polaritons in Metal Nanostructures: The Optoelectronic Route to Nanotechnology"; Opto-Electronics Review; Bearing a date of 2002; pp. 217-224; vol. 10, No. 3; COSiW SEP, Warsaw.

U.S. Appl. No. 11/974,334, Roderick A. Hyde.
U.S. Appl. No. 11/974,344, Roderick A. Hyde.
U.S. Appl. No. 12/070,914, Roderick A. Hyde.
U.S. Appl. No. 12/151,981, Roderick A. Hyde.
U.S. Appl. No. 12/283,513, Roderick A. Hyde.
U.S. Appl. No. 12/283,543, Roderick A. Hyde.

* cited by examiner

FIG. 14

Light incident/not incident on A: A=0/1
Light incident/not incident on B: B=0/1
Light not detected/detected at OUT: OUT=0/1

| A | B | OUT |
|---|---|-----|
| 0 | 0 | 0 |
| 0 | 1 | 1 |
| 1 | 0 | 1 |
| 1 | 1 | 1 |

1400

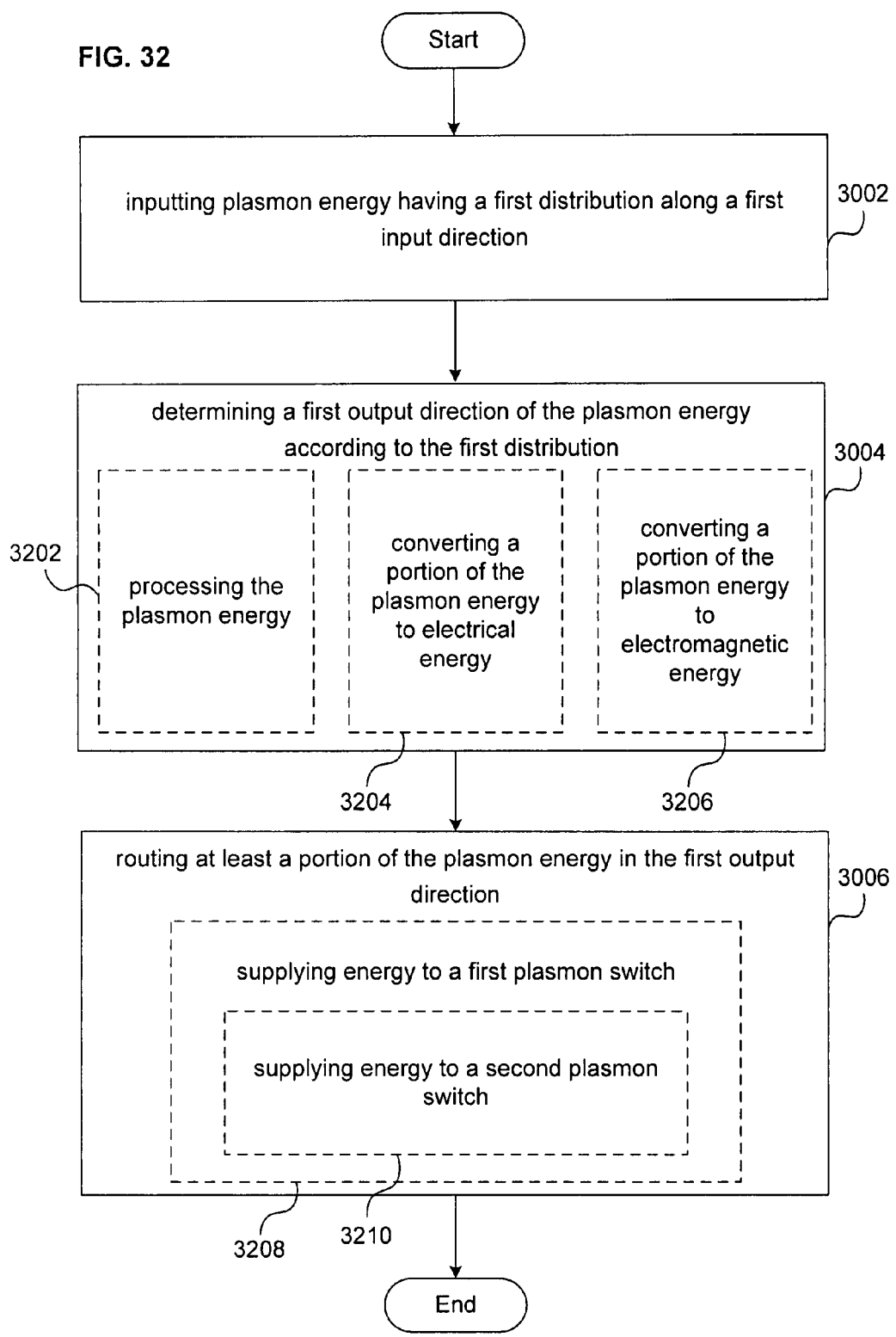

PLASMON ROUTER

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC § 119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 11/471,288, entitled Plasmon Switch, naming Roderick A. Hyde, Edward K. Y. Jung; Nathan P. Myhrvold, John Brian Pendry, Clarence T. Tegreene, and Lowell L. Wood, Jr. as inventors, filed 19 Jun. 2006 now U.S. Pat. No. 7,366,373 which is currently , or is an application of which a currently application is entitled to the benefit of the filing date.

For purposes of the USPTO extra-statutory requirements, the present application constitutes a continuation-in-part of U.S. patent application Ser. No. 11/649,710, entitled Plasmon Gate, naming Roderick A. Hyde, Edward K. Y. Jung; Nathan P. Myhrvold, John Brian Pendry, Clarence T. Tegreene, and Lowell L. Wood, Jr. as inventors, filed 4 Jan. 2007 now U.S. Pat. No. 7,379 634, which is currently , or is an application of which a currently application is entitled to the benefit of the filing date.

For purposes of the USPTO extra-statutory requirements, the present application constitutes a continuation-in-part of U.S. patent application Ser. No. 11/804,586, entitled Plasmon Multiplexing, naming Roderick A. Hyde, Edward K. Y. Jung; Nathan P. Myhrvold, John Brian Pendry, Clarence T. Tegreene, and Lowell L. Wood, Jr. as inventors, filed 17 May 2007, which is currently , or is an application of which a currently application is entitled to the benefit of the filing date. The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week 11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

SUMMARY

In one embodiment, a method comprises receiving a first input plasmon signal, the first input plasmon signal including plasmon energy; identifying at least one characteristic of the first input plasmon signal; responsive to the identifying at least one characteristic of the first input plasmon signal, selecting a first output direction corresponding to the first input plasmon signal; and transmitting a first output signal in the selected first output direction.

In another embodiment a method comprises propagating a first plasmon signal along a first plasmon-supportive path; producing a first control signal responsive to the first plasmon signal; and directing a first portion of the first plasmon signal to a second plasmon-supportive path according to the first control signal.

In another embodiment a method comprises inputting plasmon energy having a first distribution along a first input direction; determining a first output direction of the plasmon energy according to the first distribution; and routing the plasmon energy in the first output direction.

In another embodiment a plasmon router comprises a first plasmon input port receptive to an input signal including plasmon energy; a plurality of plasmon output ports transmissive of output signals including plasmon energy; and a control structure intermediate to the first plasmon input port and the plurality of plasmon output ports, the control structure being configured to selectively direct plasmon energy to the plasmon output ports responsive to a control signal.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 14 is a table corresponding to FIG. 13.
FIG. 31-32 depict variants of the flow chart of FIG. 30.

DETAILED DESCRIPTION

Figure 1:
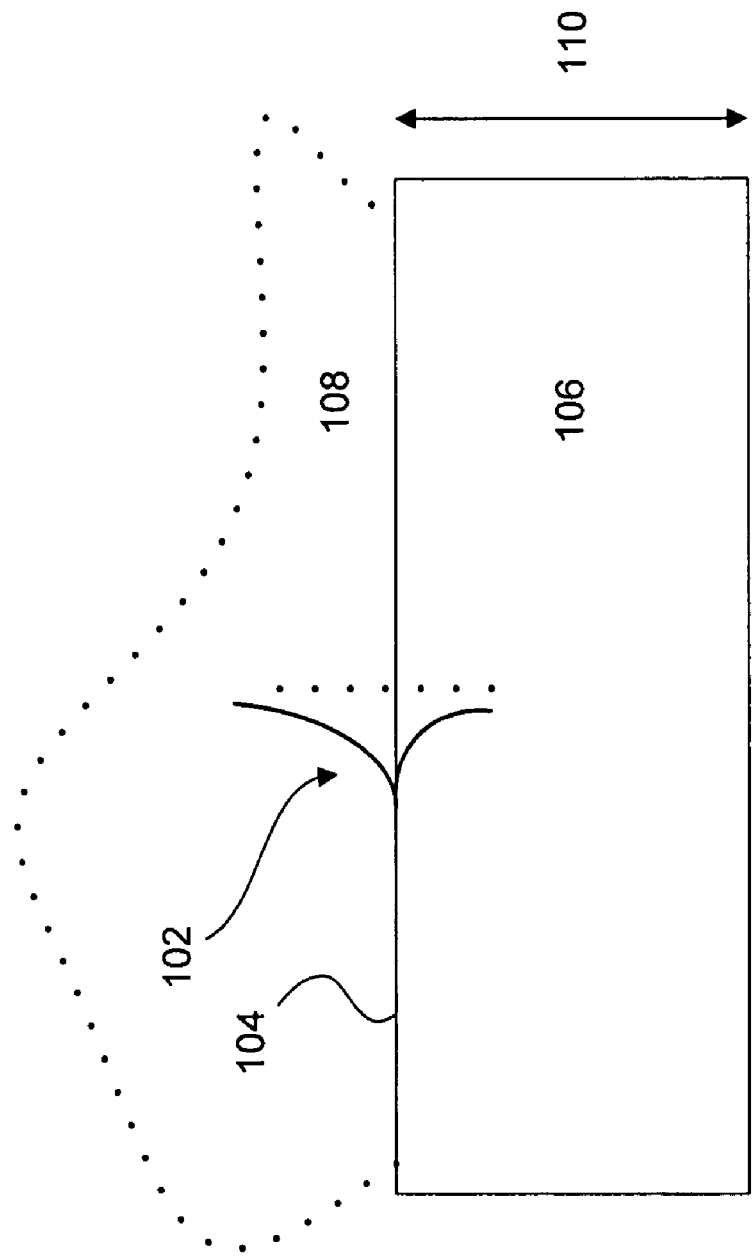
FIG. 1 is a schematic of a plasmon at a boundary.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Surface plasmons may exist on a boundary between two materials when the real parts of their dielectric constants $\in$ and $\in'$ have different signs, for example between a metal and a dielectric. FIG. 1 shows a plasmon 102 at a boundary 104 of a material 106 having a negative real dielectric constant, such as a metal. The material or structure 108 forming the boundary 104 with the material 106 may be: air, vacuum, or its equivalent; a substantially homogeneous dielectric material; or a different material or structure. The boundary 104, although shown as being substantially continuous and planar, may have a different shape. The plasmon 102, although shown as including substantially exponential functions with a field maximum at the boundary 104, may include only approximately exponential functions, may be described by a different function, and/or may have a field maximum someplace other than the boundary. Further, although the plasmon 102 is shown at a certain location on the boundary 104 for illustrative purposes, the spatial distribution of the plasmon 102 may be anything. Plasmons are described in C. Kittel, "INTRODUCTION TO SOLID STATE PHYSICS", Wiley, 2004, which is incorporated herein by reference.

In some embodiments the material thickness 110 may be smaller than the plasmon wavelength, as described in Alexandra Boltasseva, Thomas Nikolajsen, Krisjan Leosson, Kasper Kjaer, Morten S. Larsen, and Sergey I. Bozhevolnyi, "INTEGRATED OPTICAL COMPONENTS UTILIZING LONG-RANGE SURFACE PLASMON POLARITONS", Journal of Lightwave Technology, January, 2005, Volume 23, Number 1, which is incorporated herein by reference. Further, Boltasseva describes how a metal may be embedded in a dielectric to allow propagation of long-range surface plasmon polaritons, where the parameters of the metal (including thickness 110 and width, not shown) may control the propagation of the plasmon.

Figure 2:
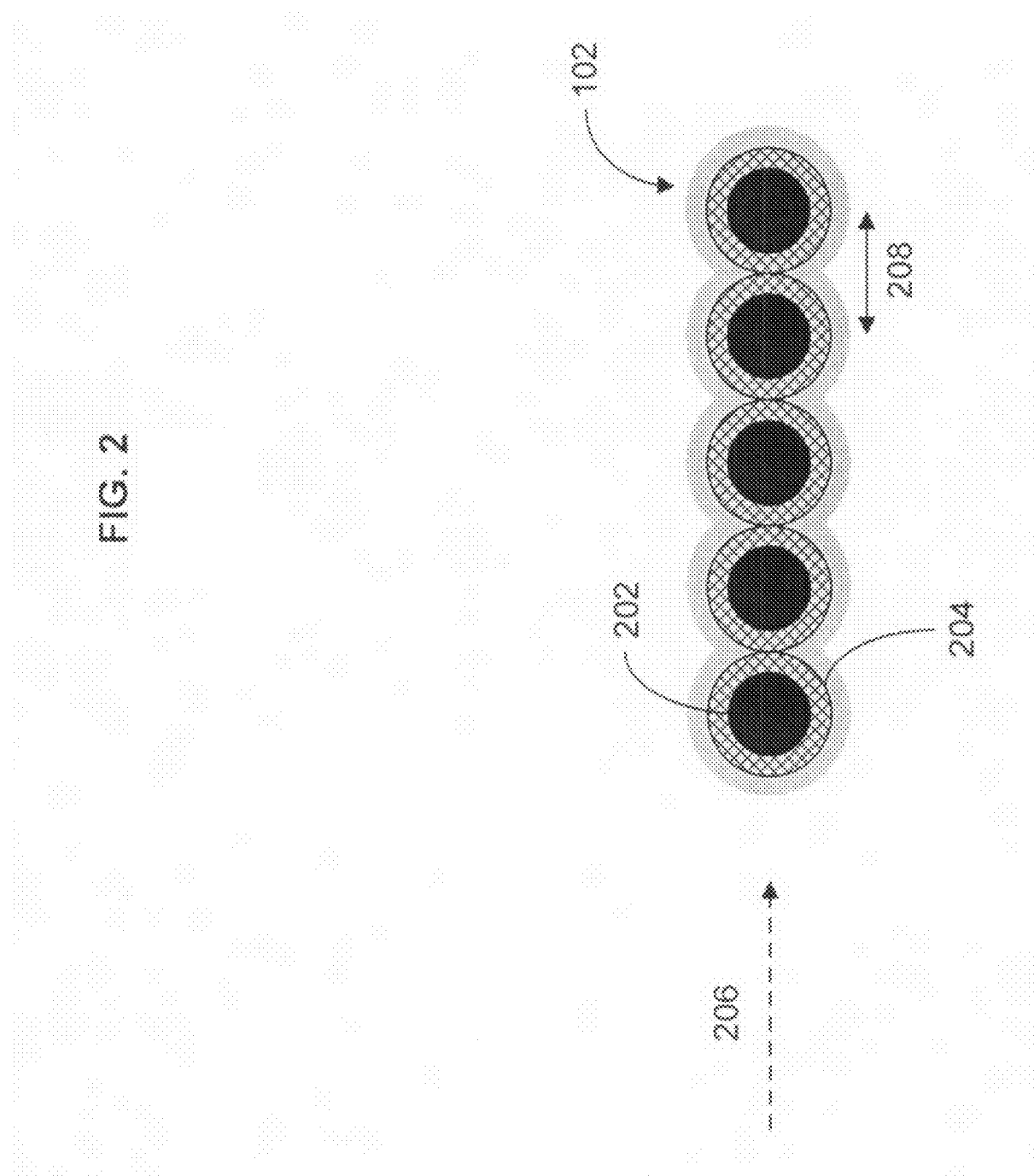
FIG. 2 is a schematic of an array of particles.

Particles 202 may be configured to support and guide surface plasmons, where the particles 202 shown in FIG. 2 are silver spheres. Particles supporting plasmons are described in M. Salerno, J. R. Krenn, B. Lamprecht, G. Schider, H. Ditlbacher, N. Félidj, A. Leitner, and F. R. Aussenegg, "PLASMON POLARITONS IN METAL NANOSTRUCTURES: THE OPTOELECTRONIC ROUTE TO NANOTECHNOLOGY", Opto-Electronics Review, 2002, Volume 10, Number 3, pages 217-222, which is incorporated herein by reference. Creation of plasmons on a particle in an electromagnetic field is described in P. G. Kik, A. L. Martin, S. A. Maier, and H. A. Atwater, "METAL NANOPARTICLE ARRAYS FOR NEAR FIELD OPTICAL LITHOGRAPHY", Proceedings of SPIE, 4810, 2002 which is incorporated herein by reference. FIG. 2 shows electromagnetic energy 206 incident on a chain of particles 202, where the particles 202 are coated with a nonlinear material 204, and the electromagnetic energy 206 couples to plasmons 102 on the particles 202. The plasmons 102 are shown having a finite extent in FIG. 2 for clarity and one skilled in the art will recognize that the spatial distribution of the plasmons 102 may fall off according to a power law away from the particles 202 and/or may have a different distribution than that shown in FIG. 2. Particles 202 may be configured on a substrate (not shown), as described in Stefan A. Maier, Paul E. Barclay, Thomas J. Johnson, Michelle D. Friedman, and Oskar Painter, "LOW-LOSS FIBER ACCESSIBLE PLASMON WAVEGUIDE FOR PLANAR ENERGY GUIDING AND SENSING", Applied Physics Letters, May 17, 2004, Volume 84, Number 20, Pages 3990-3992, which is incorporated herein by reference.

Particles 202 may be coated with nonlinear material 204, as described in N.-C. Panoiu and R. M. Osgood, Jr., "SUB-WAVELENGTH NONLINEAR PLASMONIC NANOWIRE", Nano Letters, Nov. 10, 2004, Volume 4, Number 12, Pages 2427-2430, which is incorporated herein by reference. In FIG. 2 all of the particles 202 are coated with a nonlinear material 204, however, in some embodiments only one particle may be coated with nonlinear material 204, or a different number of particles 202 may be coated with nonlinear material 204. Further, although FIG. 2 shows the particles 202 completely coated with nonlinear material 204, one or more particles 202 may only be partially coated with nonlinear material 204.

Although the particles 202 in FIG. 2 are shown as being substantially spherical, the particles may have a different shape that is configured to support plasmons. Further, although the particles 202 are shown as being substantially the same size, the particles 202 may vary in size, by design or by a randomized process of manufacturing the particles 202. Moreover, the particles need not be homogenous or even solid. Also, although the particles 202 are described as silver particles, particles 202 that support plasmons may comprise a different metal or a different material. Although the particles 202 are illustrated as having a spacing between particles 208 that is substantially constant, the spacing may vary and may be different from that shown in FIG. 2, and in some embodiments, the particles 202 may be touching or very nearly so.

Figure 3:
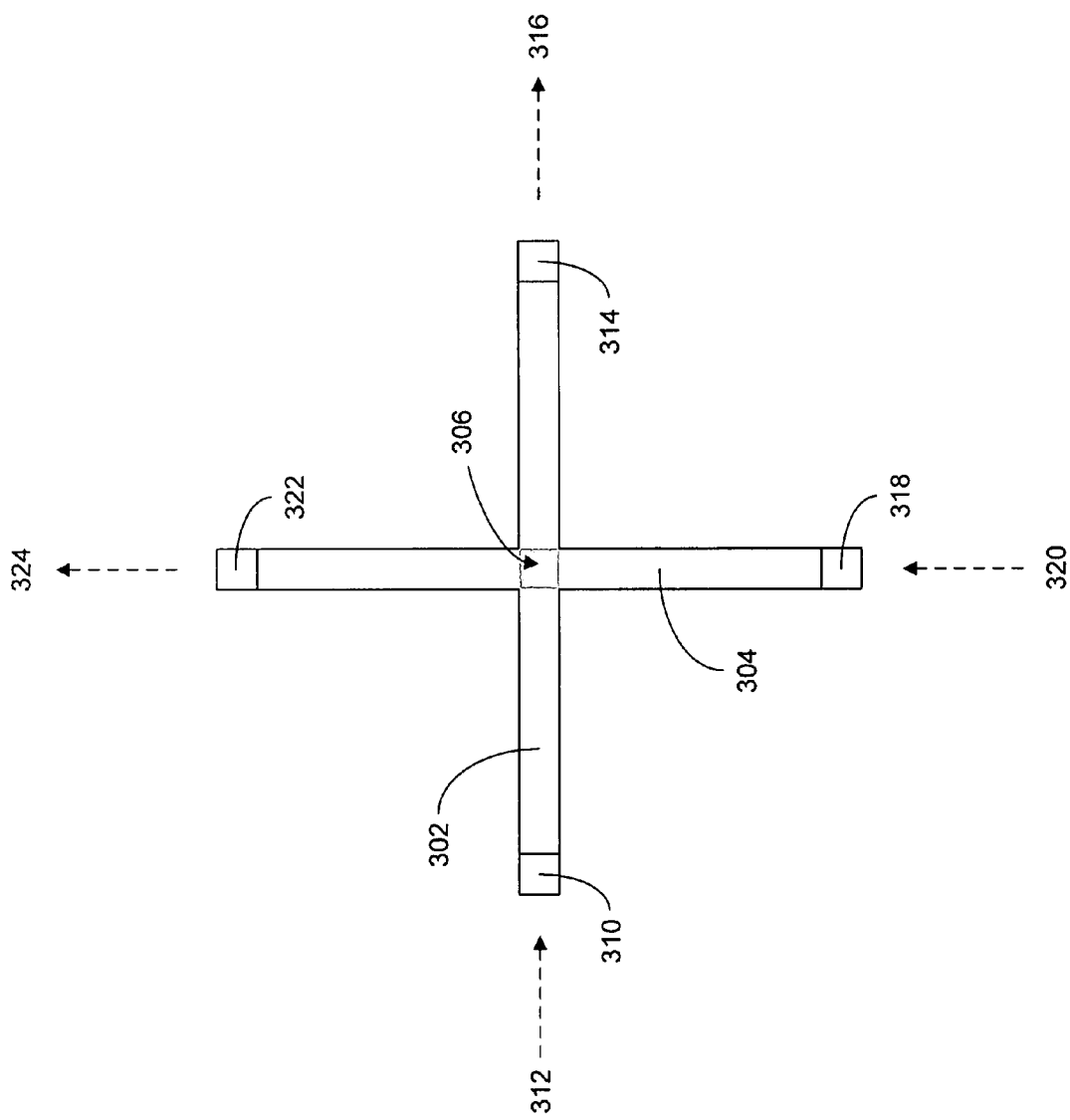
FIG. 3 is a schematic of a first path intersecting a second path.

FIG. 3 shows a top cross-sectional view of a first embodiment including a first path 302 for guiding energy at a first plasmon frequency, a second path 304 for guiding energy at a second plasmon frequency, where the first path 302 and the second path 304 form an intersection region 306 including a nonlinear material or other material configured to saturate in response to a plasmon that forms a first portion of the first path 302. The paths 302, 304 are boundaries 104 as described with respect to FIG. 1. An input coupling structure 310 is configured to convert incoming electromagnetic energy 312 into a plasmon 102 (shown in FIG. 1) that propagates along the first path 302, and an output coupling structure 314 is configured to convert a plasmon 102 propagating along the first path 302 into outgoing electromagnetic energy 316. Similarly, a second input coupling structure 318 is configured to convert incoming electromagnetic energy 320 into a plasmon 102 (shown in FIG. 1) that propagates along the second path 304, and a second output coupling structure 322 is configured to convert a plasmon 102 propagating along the second path 304 into outgoing electromagnetic energy 324. Electromagnetic energy 320 converted into a plasmon 102 propagating along the second path 304 can saturate the intersection region 306 and thus inhibit the propagation of a plasmon 102 through the intersection region 306 along the first path 302.

Although the embodiment in FIG. 3 is described such that the intersection region 306, when saturated, inhibits propagation of a plasmon 102 through the intersection region 306, in another embodiment the intersection region 306 may be configured to allow propagation of a plasmon 102 when it is saturated and inhibit or restrict propagation of a plasmon 102 when it is not saturated.

Some methods for coupling electromagnetic energy to a plasmon (and vice versa) that may be incorporated in an input and/or output coupling structure 310 and/or 314 are described in W. L. Barnes, A. Dereux, and T. W. Ebbesen, "SURFACE PLASMON SUBWAVELENGTH OPTICS", Nature, Volume 424, Aug. 14, 2003, 824-830, which is incorporated herein by reference. These methods include and are not limited to prism coupling, scattering from a topological defect on the surface on which the plasmon is to be generated, and periodic corrugation in the surface on which the plasmon is to be generated.

In some approaches the input and output coupling structures 310, 314, 318, 322 may be integral to the first and second paths 302, 304, while in other approaches, the first and second paths 302, 304 may be arranged primarily for guiding and separate structures may form the input and output coupling structures 310, 314, 318, 322.

Figure 4:
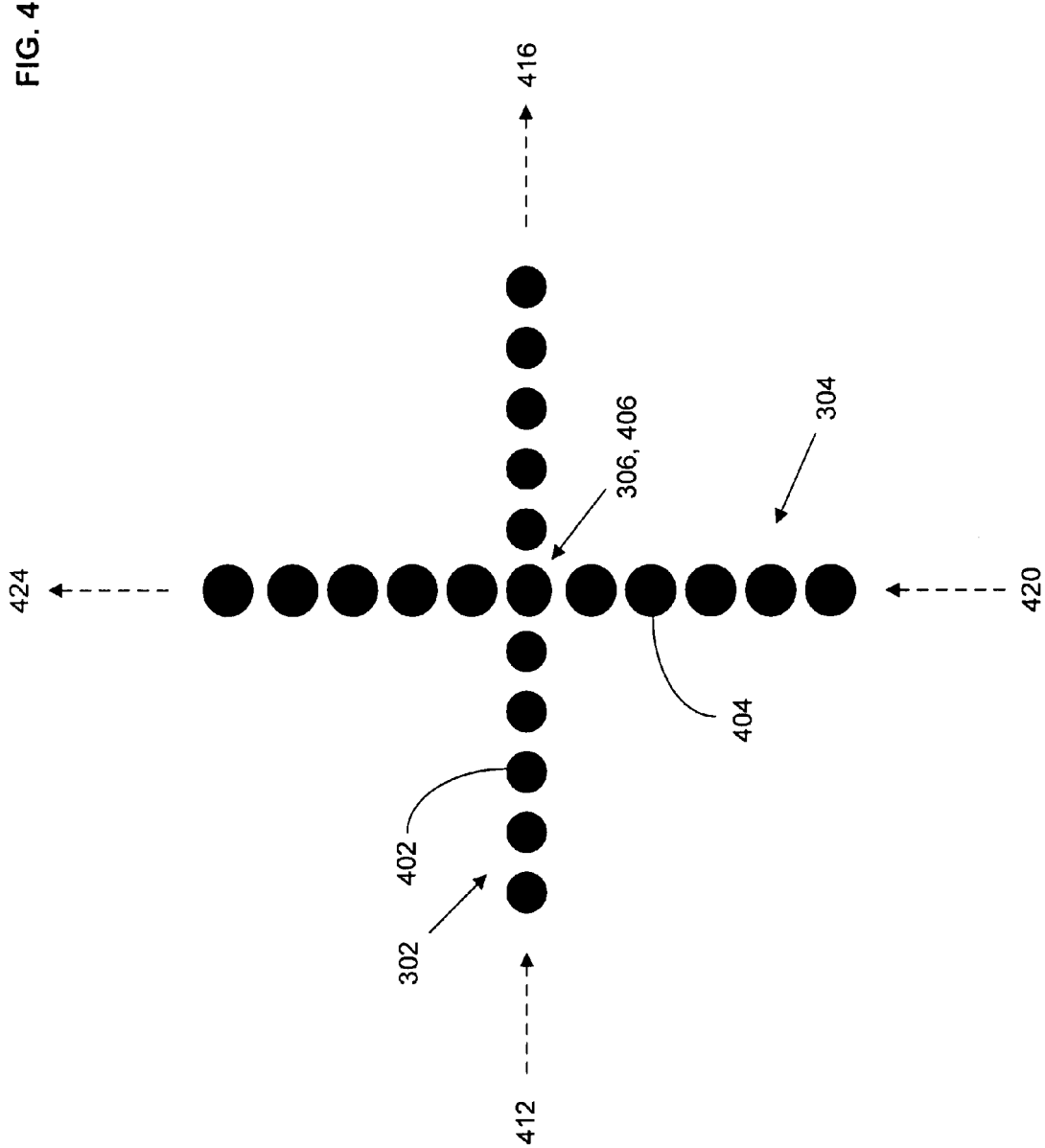
FIG. 4 is a schematic of a first path intersecting a second path.

FIG. 4 shows a top cross-sectional view of another embodiment including a first path 302 for guiding energy at a first plasmon frequency, a second path 304 for guiding energy at a second plasmon frequency, where the first path 302 and the second path 304 form an intersection region 306 that forms a first portion of the first path 302. In this case, particles 402 having a first size form the first path 302, particles 404 having a second size form the second path 304, and an elliptical particle 406 forms the intersection region 306. The particle 406 forming the intersection region 306 is configured to resonate at both the first plasmon frequency and the second plasmon frequency. In this case the intersection region 306 includes a single elliptical particle 406 configured to resonate at two frequencies, however, other assemblies may resonate at two or more frequencies, including triangular particles, assemblies of two or more particles, or a different configuration. Further, other embodiments allow the first path 302 to guide energy at a first plasmon frequency and the second path 304 to guide energy at a second plasmon frequency, for example, by varying the size, shape, material, and/or other parameters of the particles 402, 404.

Incoming electromagnetic energy 412 is converted into a plasmon 102 (shown on particles 202 in FIG. 2) that propagates along the first path 302. Plasmons 102 that pass through the intersection region 306 are then converted into outgoing electromagnetic energy 416. Similarly, incoming electromagnetic energy 420 is converted into a plasmon 102 that propagates along the second path 304. Plasmons 102 that pass through the intersection region 306 are then converted into outgoing electromagnetic energy 424. Electromagnetic energy 420 converted into a plasmon 102 propagating along the second path 304 can saturate the elliptical particle 406. The saturated elliptical particle 406 does not support propagation of plasmon energy, and thus inhibits propagation of the plasmon 102 through the intersection region 306 along the first path 302.

The embodiment in FIG. 4 is shown having paths 302, 304 with different size particles 402, 404, however in some embodiments the paths 302, 304 may have substantially the same size particles 402, 404. Further, although the embodiment is described such that plasmon propagation along the second path 304 blocks plasmon propagation along the first path 302, the reverse may be the case, where plasmon propagation along the first path 302 blocks plasmon propagation along the second path 304.

The embodiment in FIG. 4 is further described such that plasmons propagating along one path and saturating the particle 406 forming the intersection region 306 block plasmons from propagating along a different path. However, in some embodiments plasmons propagating along one path may block only a portion of the plasmon energy propagating along a different path such that the amount of plasmon energy propagating on one path determines the amount of plasmon energy that may propagate on the other path. In such an approach, the relationship between the amount of plasmon energy along the second path 304 and the amount of plasmon energy that propagates along the first path 302 is not necessarily binary. That is, the amount of plasmon energy that passes the elliptical particle 406 can be an analog function of the amount of plasmon energy arriving at the elliptical particle 406 along the second path 304.

Figure 5:
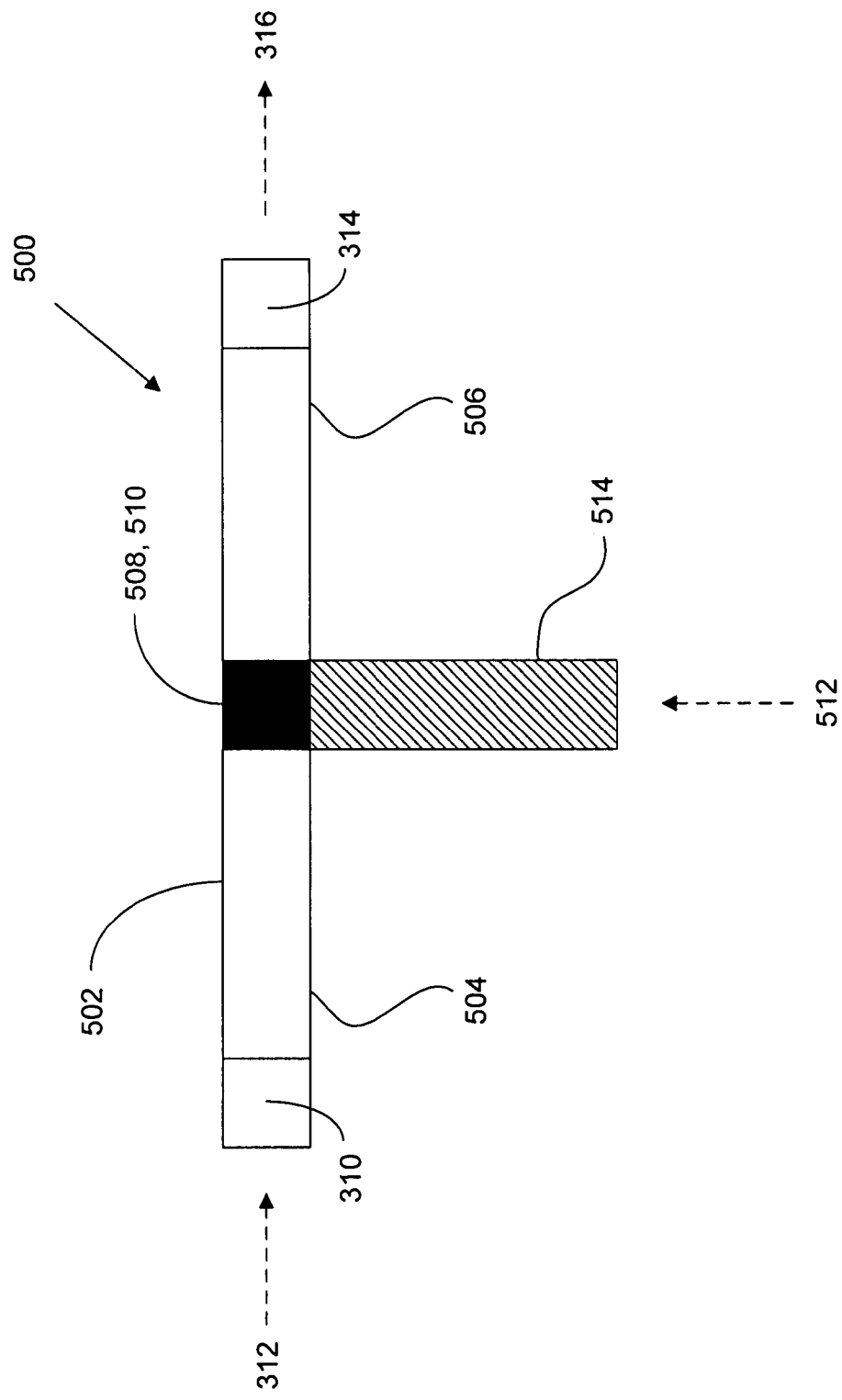
FIG. 5 is a schematic of a top cross-sectional view of a plasmon logic element.

FIG. 5 shows a top cross-sectional view of an embodiment of a plasmon logic element 500 including a first plasmon guide 502 extending from an input location 504 to an output location 506 and a first electromagnetically nonlinear structure 508 interposed at a first central location 510 (analogous to the intersection region 306 that forms a first portion of the first path 302) intermediate to the input location 504 and output location 506, where the first nonlinear structure 508 is responsive to electromagnetic energy 512 to control plasmon propagation past the first central location 510. An energy guiding structure 514 is configured to guide the electromagnetic energy 512 to the first central location 510. An input coupling structure 310 is configured to convert incoming electromagnetic energy 312 into a plasmon 102 (shown in FIG. 1) that propagates along the first plasmon guide 502, and an output coupling structure 314 is configured to convert a plasmon 102 propagating along the first plasmon guide 502 into outgoing electromagnetic energy 316.

In the embodiment shown in FIG. 5, the energy guiding structure 514 is an optical fiber configured to direct energy substantially in the optical frequency range to the first central location 510. In other embodiments, the type of energy guiding structure 514 may be determined by the frequency response of the first nonlinear structure 508. For example, the energy guiding structure may include an integrated optical waveguide, a set of particles, a carbon nanotube structure, a dielectric-dielectric interface, or any other appropriate structure that can guide the energy. In one embodiment, the energy guiding structure 514 may be configured to carry electromagnetic energy in the form of a plasmon 102. In another embodiment, the energy guiding structure 514 can be removed and electromagnetic energy 512 can be directed toward the first nonlinear structure 508 through free space or another transmissive medium. Or, electromagnetic energy 512 can emitted substantially adjacent to the first nonlinear structure, with a light emissive or plasmon emissive structure, such as a laser or another known form of locally emitting energy at the appropriate frequency.

Figure 6:
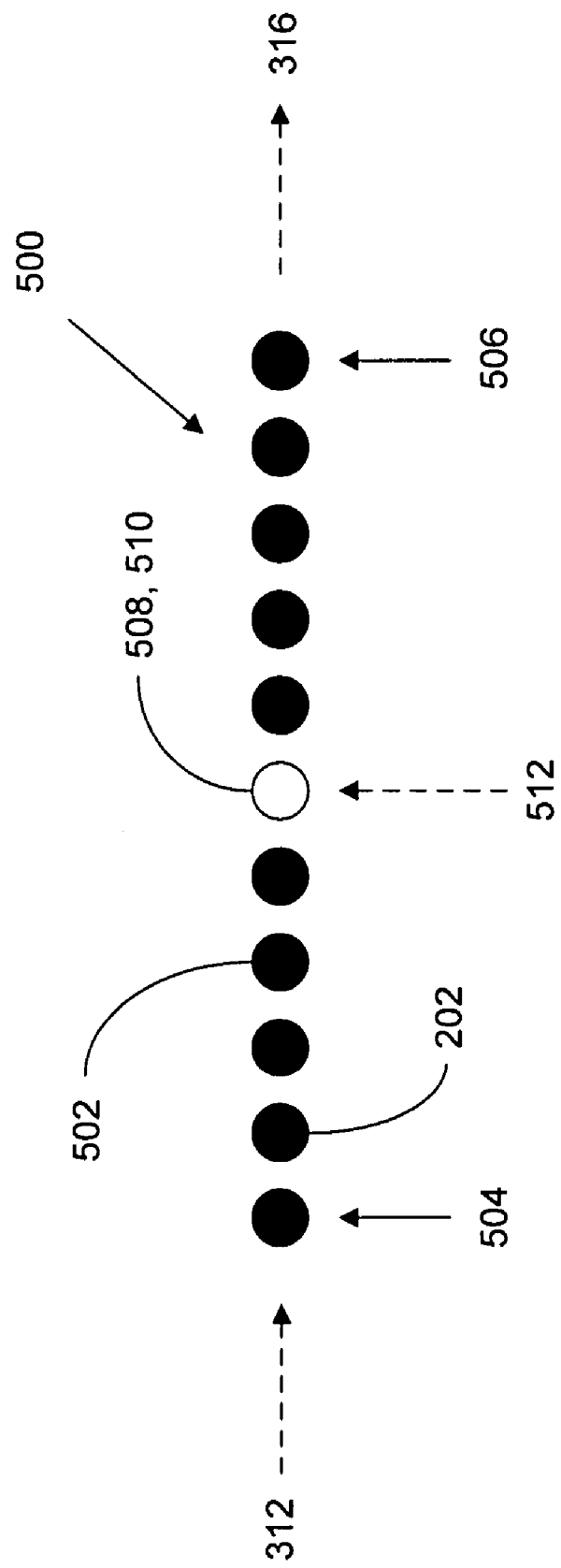
FIG. 6 is a schematic of a top cross-sectional view of a plasmon logic element including an array of particles.

FIG. 6 shows a top cross-sectional view of another embodiment of a plasmon logic element 500 including a first plasmon guide 502 extending from an input location 504 to an output location 506 and a first electromagnetically nonlinear structure 508 interposed at a first central location 510 intermediate to the input location 504 and output location 506, where the first nonlinear structure 508 is responsive to electromagnetic energy 512 to control plasmon propagation past the first central location. In the embodiment shown in FIG. 6, the first plasmon guide 502 includes an array of particles 202 and the electromagnetically nonlinear structure 508 is a metallic particle coated with nonlinear material as described with respect to FIG. 2. However, in other embodiments the electromagnetically nonlinear structure 508 may be a different structure configured to support plasmons and to saturate under certain conditions.

Although the embodiment in FIG. 6 shows only one particle 508 including nonlinear material, more than one particle in the guide 502 may include a nonlinear material, as described with respect to FIG. 2. Further, other variations may include those described with respect to FIG. 2. In an embodiment where more than one particle in the guide 502 includes a nonlinear material, electromagnetic energy 512 incident on the guide 502 can select the first central location 510 on the guide 502 where plasmon propagation is controlled. Or, a second particle 202 in the guide 502 coated with a nonlinear material may function as a second electromagnetically nonlinear structure at a second central location (not shown), where plasmon propagation along the guide 502 may be controlled at both the first central location and the second central location.

Figure 7:
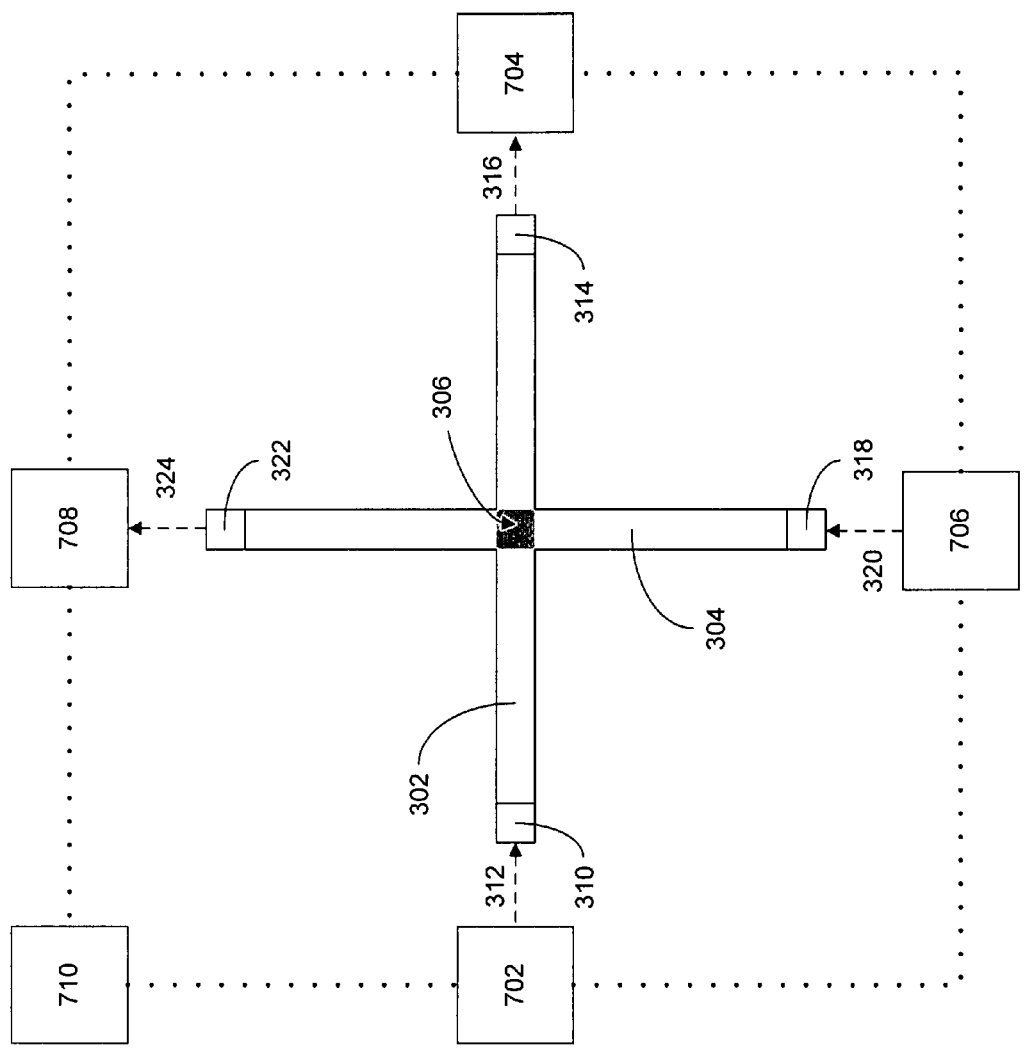
FIG. 7 is a schematic of a system including a plasmon logic element.

FIG. 7 shows a system including an embodiment similar to that in FIG. 3, where the system includes an energy generator 702 configured to produce energy. The input coupling structure 310 is configured to couple the energy from the energy generator 702 to a plasmon 102 (shown in FIG. 1). In one embodiment, the energy generator 702 may be a device configured to produce electromagnetic energy, such as a laser, and the input coupling structure 310 may include a converter configured to convert energy to a plasmon 102. Although the energy generator 702 is shown separate from the first path 302, in some embodiments the first path 302 may include the energy generator 702. Sources of electromagnetic radiation that may be included in the first path 302 are known to those skilled in the art, and may include a microcavity semiconductor laser such as that described in U.S. Pat. No. 5,825,799, entitled MICROCAVITY SEMICONDUCTOR LASER, to Seng-Tiong Ho, Daniel Yen Chu, Jian-Ping Zhang, and Shengli Wu, which is incorporated herein by reference.

FIG. 7 further includes the output coupling structure 314, where the output coupling structure 314 may include a converter configured to convert a plasmon 102 into a different form of energy such as electromagnetic energy, and/or a region arranged to output the energy. FIG. 7 further includes a detector 704, where the detector 704 may include a device configured to detect electromagnetic energy, such as a photodetector or other detector, or the detector 704 may be configured to detect a different kind of energy, depending on the type of energy output from the output coupling structure 314. Although FIG. 7 includes an input coupling structure 310 and an output coupling structure 314, in some embodiments these may not be included, for example, where the energy generator 702 is within the first path 302, the input coupling structure 310 may not be included.

FIG. 7 further includes a second energy generator 706, a second input coupling structure 318, a second output coupling structure 322, and a second detector 708. The second input coupling structure 318 is configured to couple the energy from the second energy generator 706 to a plasmon 102. In one embodiment, the second energy generator 706 may be a device configured to produce electromagnetic energy, such as a laser, and the second input coupling structure 318 may include a converter configured to convert energy to a plasmon 102. Although the second energy generator 706 is shown separate from the second path 304, in some embodiments the second path 304 may include the energy generator.

The second output coupling structure 322 may include a converter configured to convert a plasmon 102 into a different form of energy such as electromagnetic energy, and/or a region arranged to output the energy. The second detector 708 is configured to receive energy from the second output coupling structure 322 and may include a device configured to detect electromagnetic energy, such as a photodetector or other detector, or the second detector 708 may be configured to detect a different kind of energy, depending on the type of energy output from the second output coupling structure 322. Although FIG. 7 includes a second input coupling structure 318 and a second output coupling structure 322, in some embodiments these may not be included, for example, where the second energy generator 706 is within the second path 304, the second input coupling structure 318 may not be included.

FIG. 7 further includes a processor 710 operably connected to the energy generator 702, the detector 704, the second energy generator 706, and the second detector 708. The processor 710 may be connected directly to the elements 702, 704, 706, 708, and/or there may be intermediate devices. Further, there may be more than one processor 710. Although the processor 710 is shown only in FIG. 7, any of the embodiments may include a processor 710, where the processor 710 may be operably coupled to elements of the system, where the elements are not limited to those described above.

Although the processor of FIG. 7 is described with reference to FIG. 3, the corresponding structures, methods, systems, and apparatuses can be used in conjunction with any of the embodiments. Moreover, although the embodiment of FIG. 7 illustrates a single processor and a single generator, the structures, methods, systems, and apparatuses herein may include one or more energy generators 702, 706 and/or detectors 704, 708, and/or processor(s) 710. A processor may include electrical circuitry and/or other apparatuses for processing signals.

Figure 8:
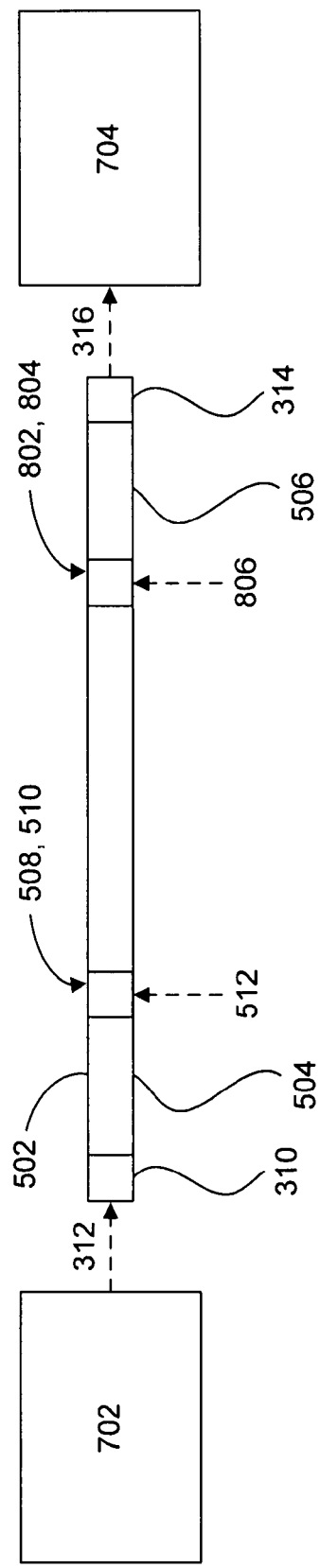
FIG. 8 is a schematic of a top cross-sectional view of a plasmon logic element.

FIG. 8 shows a top cross-sectional view of an embodiment similar to that of FIG. 5, further including a second electromagnetically nonlinear structure 802 interposed at a second central location 804 intermediate to the input location 504 and output location 506. Although the embodiment shown in FIG. 8 does not include the energy guiding structure 514, in other embodiments it may include an energy guiding structure 514 configured to guide energy to the first central location 510, and/or it may include a second energy guiding structure (not shown) configured to guide energy to the second central location 804.

As described with respect to FIG. 5, the input coupling structure 310 is configured to convert incoming electromagnetic energy 312 into a plasmon 102 (shown in FIG. 1), and the output coupling structure 314 is configured to convert a plasmon 102 into outgoing electromagnetic energy 316. In the embodiment shown in FIG. 8, the first and second central locations 510, 804 both include an electromagnetically nonlinear structure configured to saturate when electromagnetic energy 512 or 806 is incident on it. Thus a plasmon 102 may propagate along the first plasmon guide 502 through the first and second central locations 510, 804 when electromagnetic energy 512, 806 is not incident on the first and second central locations 510, 804, and when electromagnetic energy 512 or 806 is incident on one of the first and second central locations 510, 804, the plasmon 102 may not propagate through the first and/or second central locations 510, 804. Thus electromagnetic energy 512 or 806 incident on either the first or second central location 510 or 806 can inhibit electromagnetic energy 316 from being detected by the detector 704. Although the embodiment shown in FIG. 8 includes two electromagnetically nonlinear structures 508 and 802, the system may be configured with any number of these. Further, although the first and second central locations 510, 804 are shown as small, rectilinear portions of the first plasmon guide 502, they may be shaped differently depending upon the design considerations.

Figure 9:
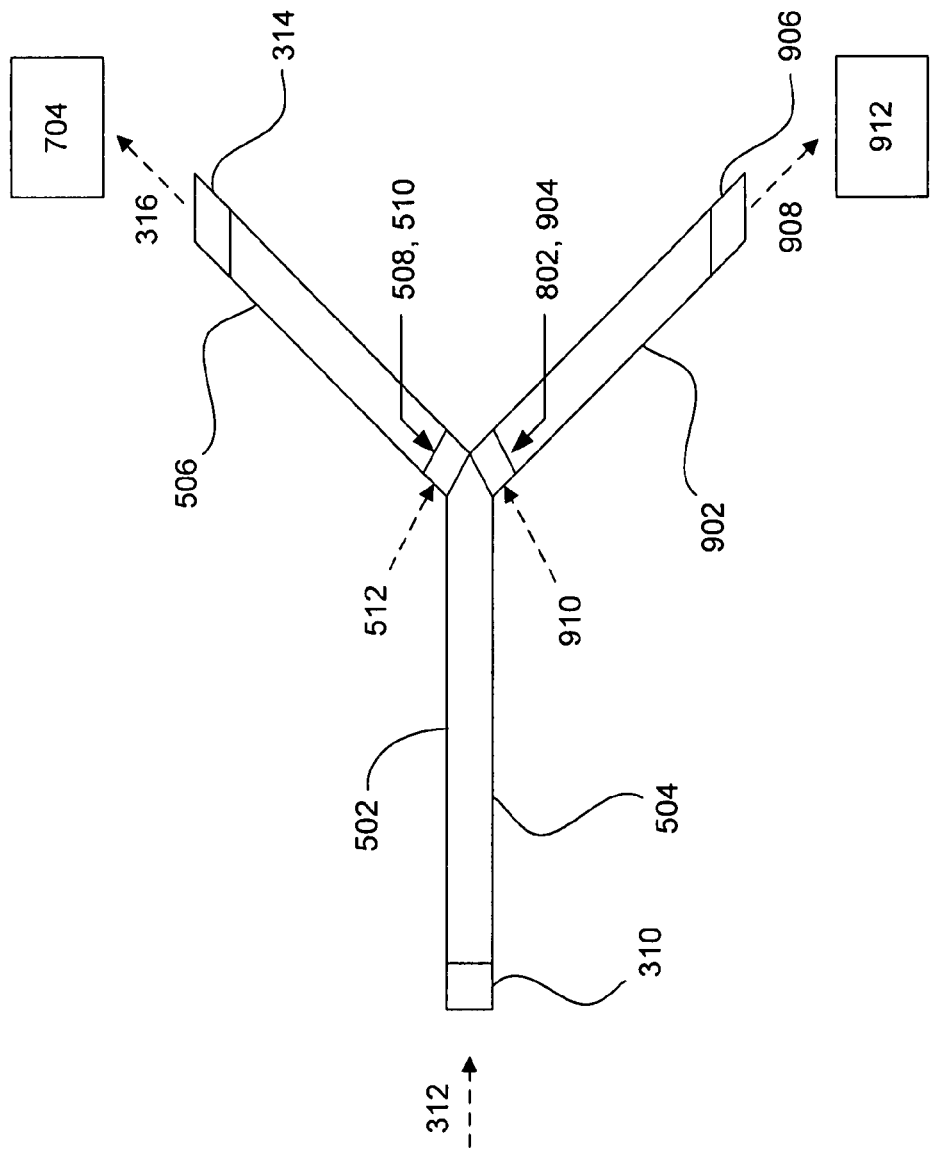
FIG. 9 is a schematic of a top cross-sectional view of a plasmon logic element.

FIG. 9 shows a top cross-sectional view of another embodiment similar to that in FIG. 5, further including a second electromagnetically nonlinear structure 802 and a second output location 902 located on one branch of a 'Y' shaped structure, wherein the second electromagnetically nonlinear structure 802 is interposed at a second central location 904 intermediate to the input location 504 and the second output location 902.

The input coupling structure 310 is configured to convert incoming electromagnetic energy 312 into a plasmon 102 (shown in FIG. 1), and the output coupling structures 314, 906 are each configured to convert a plasmon 102 into outgoing electromagnetic energy 316, 908.

In the embodiment shown in FIG. 9, the first and second central locations 510, 904 both include an electromagnetically nonlinear structure 508, 802 configured to saturate when electromagnetic energy 512 or 910 is incident on it. Thus a plasmon 102 may propagate along the first plasmon guide 502 through the first and second central locations 510, 904 when electromagnetic energy 512, 910 is not incident on the first and second central locations 510, 904. When electromagnetic energy 512 is incident on the first central location 510 the plasmon 102 may not propagate through the first central location 510, and thus electromagnetic energy 512 incident on the first central location 510 can inhibit electromagnetic energy 316 from being detected by the detector 704. Similarly, when electromagnetic energy 910 is incident on the second central location 904 the plasmon 102 may not propagate through the second central location 904, and thus electromagnetic energy 910 incident on the second central location 904 can inhibit electromagnetic energy 908 from being detected by the detector 912. Or, when electromagnetic energy 512, 910 is incident on both the first central location and the second central location 510 and 904 the plasmon 102 may not propagate through either the first or second central locations 510 or 904, and thus electromagnetic energy 512, 910 incident on the first and second central locations 510 and 904 can inhibit electromagnetic energy 316 and 908 from being detected by the detectors 704 and 912.

Although the embodiment shown in FIG. 9 includes two electromagnetically nonlinear structures 508 and 802, the system may be configured with any number of these. Further, although the first and second central locations 510, 904 are shown as small, rectilinear portions of the first plasmon guide 502, they may be configured in a different shape.

Figure 10:
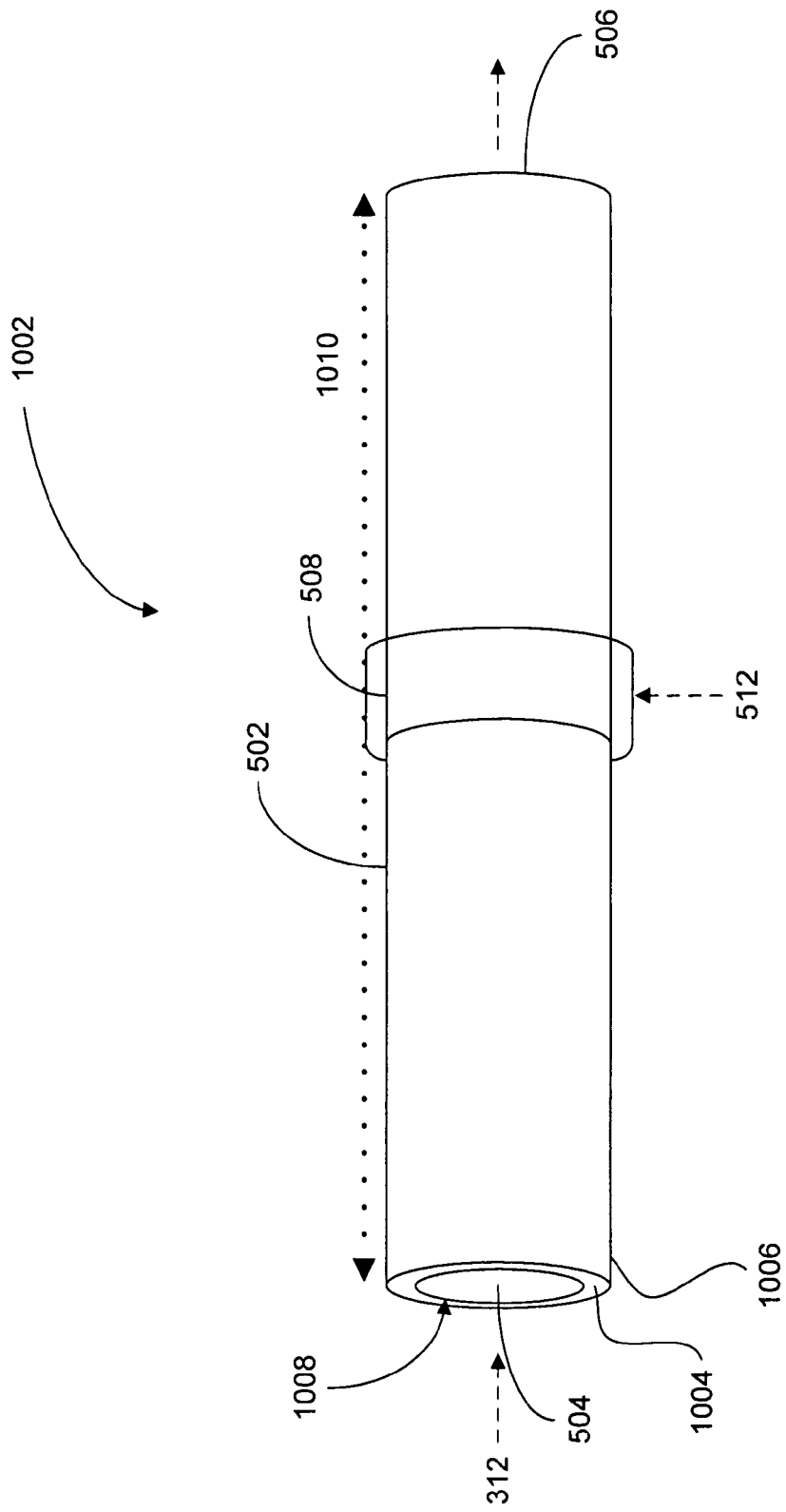
FIG. 10 is a schematic of a plasmon logic element configured on a fiber.

In the embodiment shown in FIG. 10, an electromagnetically nonlinear structure 508 is configured on a fiber 1002 having an outer conductive layer 1004, where the fiber 1002 forms a first plasmon guide 502 extending from an input location 504 to an output location 506, and where the first electromagnetically nonlinear structure 508 is interposed at a first central location 510 intermediate to the input location 504 and output location 506. The first electromagnetically nonlinear structure 508 is fabricated on the conductive layer 1004, where the first nonlinear structure 508 is responsive to electromagnetic energy 512 to control plasmon propagation past the first central location 510.

Electromagnetic energy 312 is coupled into and propagates in the fiber 1002 and couples to an evanescent wave in the conductive layer 1004, which couples to a plasmon 102 (shown in FIG. 1) on an outer surface 1006 of the conductive layer 1004. The conductive layer 1004 may include a high conductivity metal such as, silver, gold, or copper, or it may be another type of metal or conductive material. Metal-coated fibers are known to those skilled in the art and various methods exist for coating a fiber with metal, including vacuum evaporation and sputtering.

Although the fiber 1002 in FIG. 10 has a substantially circular cross-section 1008 that remains substantially constant along the length 1010 of the fiber 1002, the fiber 1002 may have any shape, including but not limited to irregular cross-sections 1008 and/or cross-sections 1008 that vary along the length 1010.

Figure 11:
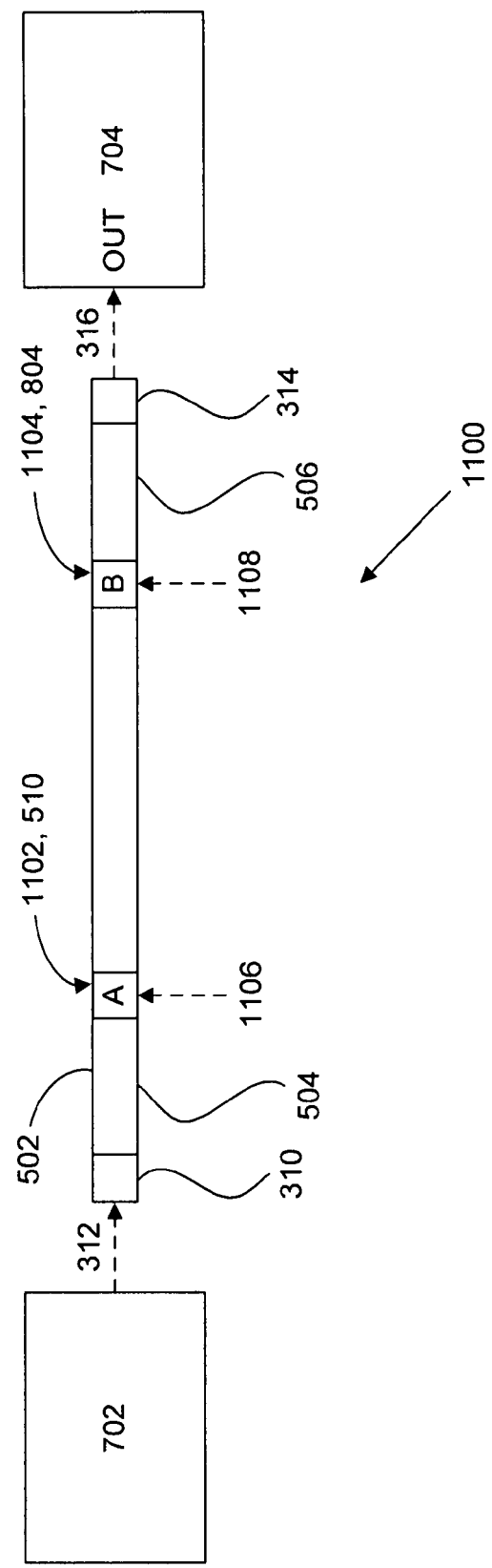
FIG. 11 is a schematic of a first embodiment of a plasmon gate.

A first embodiment of a plasmon gate 1100, shown in FIG. 11 (and similar to the embodiment shown in FIG. 8), comprises a first plasmon guide 502 extending from an input location 504 to an output location 506, a first plasmon switch 1102 interposed at a first central location 510 intermediate the input location 504 and output location 506 and responsive to a first signal 1106, and a second plasmon switch 1104 interposed at a second central location 804 intermediate the input location 504 and output location 506 and responsive to a second signal 1108, wherein the first switch 1102 and the second switch 1104 are arranged to control plasmon propagation to the output location 506. The input coupling structure 310 is configured to convert incoming electromagnetic energy 312 into a plasmon 102 (shown in FIG. 1), and the output coupling structure 314 is configured to convert a plasmon 102 into outgoing electromagnetic energy 316.

Figure 12:
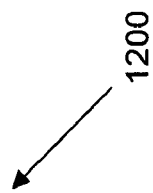
FIG. 12 is a table corresponding to FIG. 11.

A table 1200 (truth table) shown in FIG. 12 further illustrates the operation of the plasmon gate 1100. In the example shown in FIG. 11, when the first signal 1106 is incident on the first plasmon switch 1102, a plasmon 102 is inhibited from passing through the switch 1102, representing a '0' in the table 1200. When the first signal 1106 is not incident on the first plasmon switch 1102, a plasmon 102 may propagate through the switch 1102, representing a '1' in the table 1200.

Similarly, when the second signal 1108 is incident on the second plasmon switch 1104, a plasmon 102 is inhibited from passing through the switch 1104, representing a '0' in the table 1200, and when the second signal 1108 is not incident on the second plasmon switch 1104, a plasmon 102 may propagate through the switch 1104, representing a '1' in the table 1200.

Thus a plasmon 102 may propagate along the first plasmon guide 502 through the first and second plasmon switches 1102, 1104 when a signal 1106, 1108 is not incident on the switches 1102, 1104, allowing electromagnetic energy 316 to be detected by the detector 704, represented by a '1' in the 'OUT' column of the table 1200. When a signal 1106 or 1108 is incident on one of the first and second plasmon switches 1102, 1104, the plasmon 102 may not propagate through the first and/or second plasmon switch 1102, 1104. Thus a signal 1106 or 1108 incident on either the first or second plasmon switch can inhibit electromagnetic energy 316 from being detected by the detector 704, represented by a '0' in the 'OUT' column of the table 1200.

Figure 13:
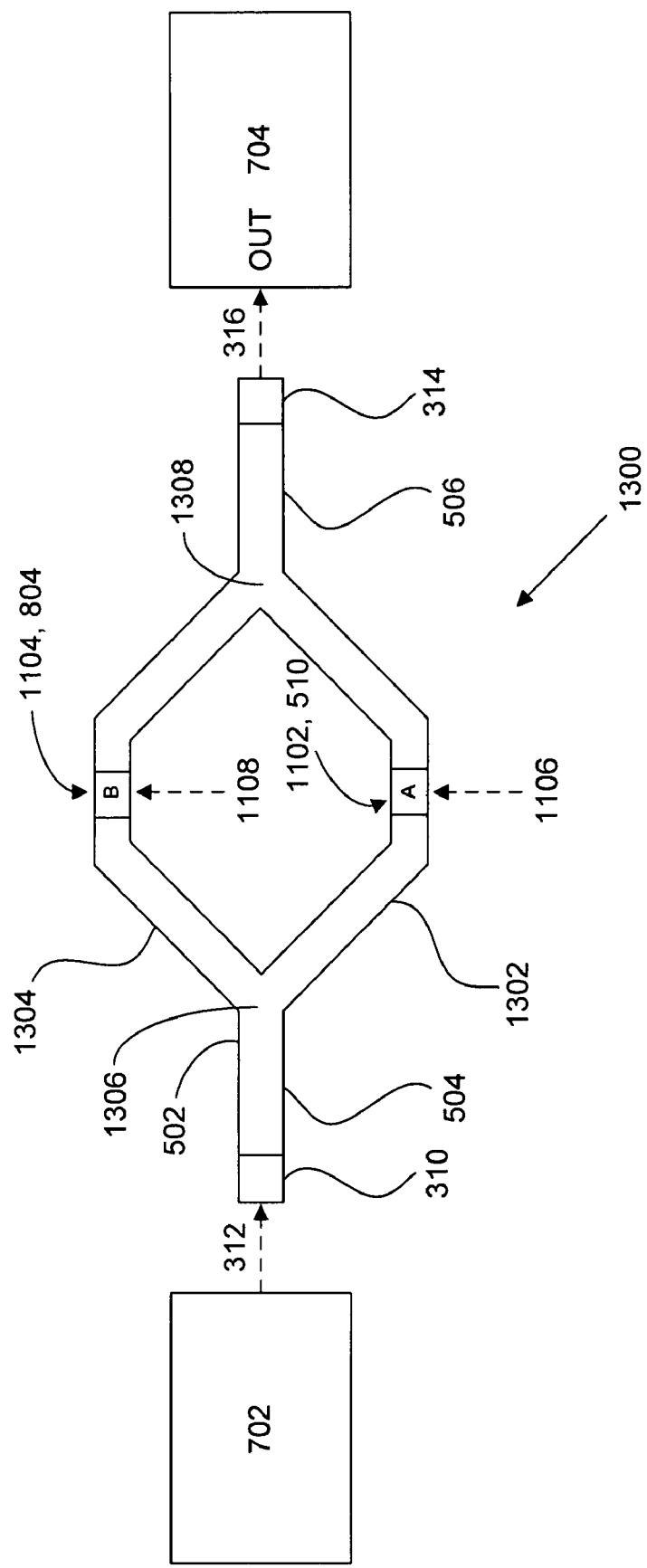
FIG. 13 is a schematic of a second embodiment of a plasmon gate.

In a second embodiment of a plasmon gate 1300, shown in FIG. 13, the first plasmon guide 502 extends from an input location 504 to an output location 506 and is arranged to route plasmon energy into a first branch 1302 and a second branch 1304 at a first intersection location 1306. The first branch 1302 includes the first plasmon switch 1102 responsive to a first signal 1106 at a first central location 510 and the second branch 1304 includes the second plasmon switch 1104 responsive to a second signal 1108 at a second central location 804, wherein the first switch 1102 and the second switch 1104 are arranged to control plasmon propagation to the output location 506. The first plasmon guide 502 is arranged to join plasmon energy from the first branch 1302 and the second branch 1304 at a second intersection location 1308. The input coupling structure 310 is configured to convert incoming electromagnetic energy 312 into a plasmon 102 (shown in FIG. 1), and the output coupling structure 314 is configured to convert a plasmon 102 into outgoing electromagnetic energy 316. Although FIG. 13 is shown having two branches 1302, 1304 and two plasmon switches 1102, 1104, other embodiments may include three or more branches and/or three or more switches, where each switch may be on a different branch or two or more switches may be on a single branch.

A table 1400 (truth table) shown in FIG. 14 further illustrates the operation of the plasmon gate 1300. When the first signal 1106 is incident on the first plasmon switch 1102, a plasmon 102 is inhibited from passing through the switch 1102, representing a '0' in the table 1400. When the first signal 1106 is not incident on the first plasmon switch 1102, a plasmon 102 may propagate through the switch 1102, representing a '1' in the table 1200.

Similarly, when the second signal 1108 is incident on the second plasmon switch 1104, a plasmon 102 is inhibited from passing through the switch 1104, representing a '0' in the table 1200, and when the second signal 1108 is not incident on the second plasmon switch 1104, a plasmon 102 may propagate through the switch 1104, representing a '1' in the table 1400.

Thus, a plasmon 102 may propagate along the first plasmon guide 502 through the first and second plasmon switches 1102, 1104 when a signal 1106, 1108 is not incident on the switches 1102, 1104, allowing electromagnetic energy 316 to be detected by the detector 704, represented by a '1' in the 'OUT' column of the table 1400. When a signal 1106 or 1108 is incident on one of the first and second plasmon switches 1102, 1104, the plasmon 102 may propagate through the other plasmon switch 1102, 1104. For example, when a signal 1106 is incident on the first plasmon switch 1102, a plasmon 102 may not propagate through the first plasmon switch 1102, but it may propagate through the second plasmon switch 1104, allowing electromagnetic energy 316 to be detected by the detector 704, represented by a '1' in the 'OUT' column of the table 1400. A signal 1106 or 1108 incident on both the first or second plasmon switch can inhibit electromagnetic energy 316 from being detected by the detector 704, represented by a '0' in the 'OUT' column of the table 1400.

With regard to the embodiments shown in FIGS. 11 and 13, the input coupling structure 310 is shown as being receptive to electromagnetic energy 312; however in other embodiments the input coupling structure 310 may be receptive to a different kind of energy, for example, plasmon energy. Similarly, the output coupling structure 314 is shown as being configured to output electromagnetic energy 316, but in other embodiments the output coupling structure 314 may be configured to output a different kind of energy, for example, plasmon energy and/or electromagnetic energy.

The first signal 1106 and/or the second signal 1108 in FIGS. 11 and 13 may include electromagnetic energy, plasmon energy, and/or a different form of energy, depending on the switches 1102, 1104. The first and/or second plasmon switch 1102, 1104 may include an electromagnetically non-linear structure, as described, for example, with respect to FIG. 3. The first plasmon guide 502 may be arranged substantially in a single plane or it may be configured in a non-planar arrangement.

Although the embodiments shown in FIG. 11 and 13 do not include an energy guiding structure 514, other embodiments may include one or more energy guiding structures 514 configured to guide energy including the first and/or second signal 1106, 1108 to the first and/or second plasmon switch 1102, 1104.

Although FIGS. 11 and 13 show substantially linear guides, in other embodiments the first plasmon guide 502 may include at least one particle supportive of plasmon energy, as shown in FIGS. 2, 4 and 6.

Although the configuration of the gates 1100 and 1300 represented by tables 1200 and 1400 include switches 1102, 1104 that are represented by a '0' when a signal 1106 or 1108 is incident on them and by a '1' when a signal 1106 or 1108 is not incident on them, the switches may be configured such that a signal 1106 or 1108 incident on them is represented by a '1' and a signal 1106 or 1108 not incident on them is represented by a '0', and one skilled in the art may select and configure switches to produce a gate having a desired functional dependence. Further, although the tables 1200 and 1400 represent functions that are substantially constant in time, in other embodiments gates 1100, 1300 may be configured such that they are represented by functions that vary as a function of time. For example, in one embodiment, the switches 1102, 1104 may be configured to be responsive to a time-varying signal (not shown) such as a time-varying electromagnetic signal, electric or magnetic field, mechanical stress or strain, or a different time-varying stimulus, where the time-varying signal changes the properties of the switch as a function of time.

Although the embodiments shown in FIGS. 11 and 13 each include two plasmon switches 1102, 1104, other embodiments may have different numbers of switches. Further, although the first and second central locations 510, 804 are shown as small, rectilinear portions of the first plasmon guide 502, they may be shaped differently depending upon the design considerations.

In one embodiment a method of controlling energy propagation comprises guiding energy at a first plasmon frequency along a first path (or first plasmon guide 502), blocking the guided energy at the first plasmon frequency from propagating along the first path 502 responsive to a first signal 1106 at a first time, blocking the guided energy at the first plasmon frequency from propagating along the first path 502 responsive to a second signal 1108, different from the first signal 1106, at a second time, and receiving an output (for example, the outgoing electromagnetic energy 316) that is a function of the first signal 1106 and the second signal 1108. The second time may follow the first time, may be substantially the same as the first time, or may precede the first time. The embodiment may further comprise guiding energy at a second plasmon frequency along the first path 502.

The method may further comprise, at a first location (or first intersection location 1306) on the first path 502, directing a first portion of the energy at the first plasmon frequency into a first branch 1302, directing a second portion of the energy at the first plasmon frequency into a second branch 1304, and/or combining the first portion of the energy at the first plasmon frequency from the first branch 1302 and the second portion of the energy at the first plasmon frequency from the second branch 1304 at a second location (or second intersection location 1308) on the first path. The method may further comprise applying the first signal 1106 to the first branch 1302 and/or applying the second signal 1108 to the second branch 1304.

The method may further comprise coupling electromagnetic energy to the first path 502, generating the electromagnetic energy, coupling plasmon energy to the first path 502, generating the plasmon, and/or generating a plasmon along the first path. The method may further comprise generating the first and/or second signal 1106, 1108, and/or guiding the first and/or second signal 1106, 1108. The method may further comprise detecting, storing, and/or sending the output 316.

Blocking the guided energy at the first plasmon frequency from propagating along the first path 502 responsive to a first signal 1106 may include saturating a first portion of the first path (or first central location 510) with the first signal 1106 and, similarly, blocking the guided energy at the first plasmon frequency from propagating along the first path 502 responsive to a second signal 1108 may include saturating a second portion of the first path (or second central location 804) with the second signal 1108.

In one embodiment, a method comprises inputting a plasmon signal, selectively controlling the plasmon signal with a plurality of control signals (a first signal 1106 and a second signal 1108), and outputting a plasmon signal having a distribution that is a function of the plurality of control signals. The distribution may be a spatial distribution, a temporal distribution, or a different kind of distribution. It may be a function of the input plasmon signal, where the function may be substantially described by a table such as those in FIGS. 12 and 14 and/or may vary in time. The method may comprise generating at least one of the plurality of control signals 1106, 1108, where at least one of the plurality of control signals 1106, 1108 may include plasmon energy and/or at least one of the plurality of control signals may include electromagnetic energy.

In one embodiment, an apparatus such as the plasmon gate 1100 comprises a plasmon input (or input location 504) receptive to a first plasmon signal, a first control input (or first plasmon switch 1102) receptive to a first control signal (the first signal 1106), a second control input (or second plasmon switch 1104) receptive to a second control signal (the second signal 1108), and a plasmon output (or output location 506) configured to output a second plasmon signal as a function of the first plasmon signal, the first control signal 1106 and the second control signal 1108. The embodiment may further comprise a third control input receptive to a third control signal, not shown. The first control input 1102 may be further receptive to a third control signal, also not shown. The function of the first plasmon signal, the first control signal 1106 and the second control signal 1108 is substantially described by a table such as the tables 1200 and 1400 in FIGS. 12 and 14, where the table may describe an OR gate, an AND gate, or a different kind of gate.

Although the embodiments described in FIGS. 1-14 are generally described such that saturation of a region and/or energy incident on a nonlinear material inhibits propagation of a plasmon 102 through the region and/or material, in other embodiments saturation of a region and/or energy incident on a nonlinear material may be configured to allow propagation of a plasmon 102, and no saturation of a region and/or energy not incident on a nonlinear material may be configured to inhibit and/or restrict propagation of a plasmon 102.

Figure 15:
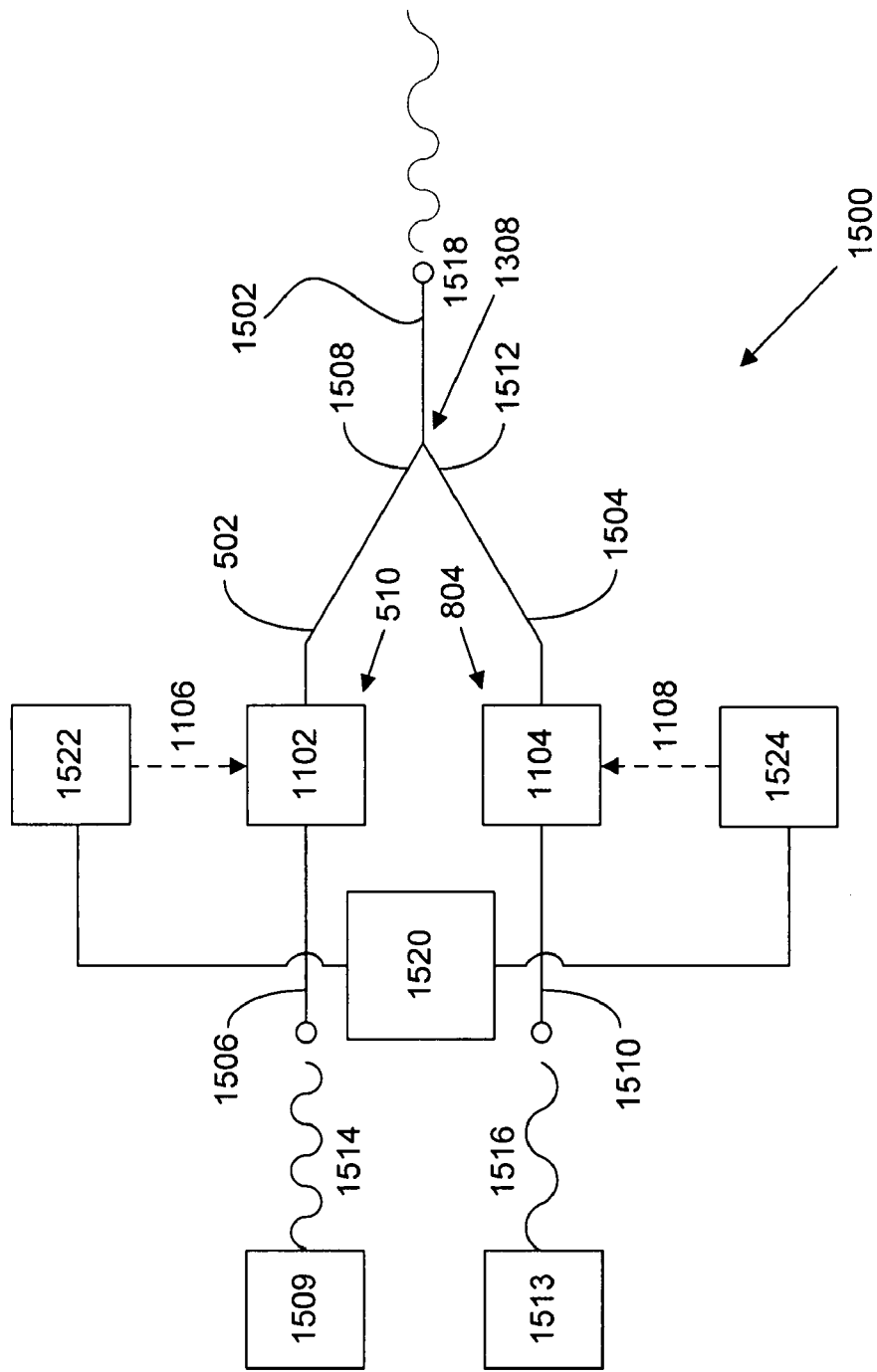
FIG. 15 is a schematic of a plasmon multiplexer.

A first embodiment of a plasmon multiplexer 1500, shown in FIG. 15, includes a first plasmon guide 502 extending from a first input location 1506 to a first output location 1508 and receptive to energy from a first plasmon source 1509; a first plasmon switch 1102 interposed at a first central location 510 intermediate the first input location 1506 and first output location 1508 and responsive to a first signal 1106; a second plasmon guide 1504 extending from a second input location 1510 to a second output location 1512 and receptive to energy from a second plasmon source 1513; a second plasmon switch 1104 interposed at a second central location 804 intermediate the second input location 1510 and second output location 1512 and responsive to a second signal 1108; and a transmission guide 1502 positioned to receive energy from the first plasmon guide 502 and the second plasmon guide 1504. The first plasmon guide 502 and the second plasmon guide 1504 are configured to join at a second intersection location 1308 and transmit energy to the transmission guide 1502.

In one embodiment the multiplexer 1500 forms a system that includes circuitry 1520. The circuitry 1520 may include signal mixing circuitry responsive to the first switched plasmon signal (for example, the signal that is output from the first plasmon switch 1102 along the first plasmon guide 502) and the second switched plasmon signal (for example, the signal that is output from the second plasmon switch 1104 along the second plasmon guide 1504) to produce a multiplexed signal (for example, the output wave 1618). The system may further comprise a first energy generator 1522 and/or a second energy generator 1524 that produce control signals (the first and second signals 1106, 1108). The energy generators 1522, 1524 may produce electromagnetic energy, plasmon energy, and/or a different kind of energy. The energy generators 1522, 1524 may produce square waves or one or more different waveforms.

Figure 16:
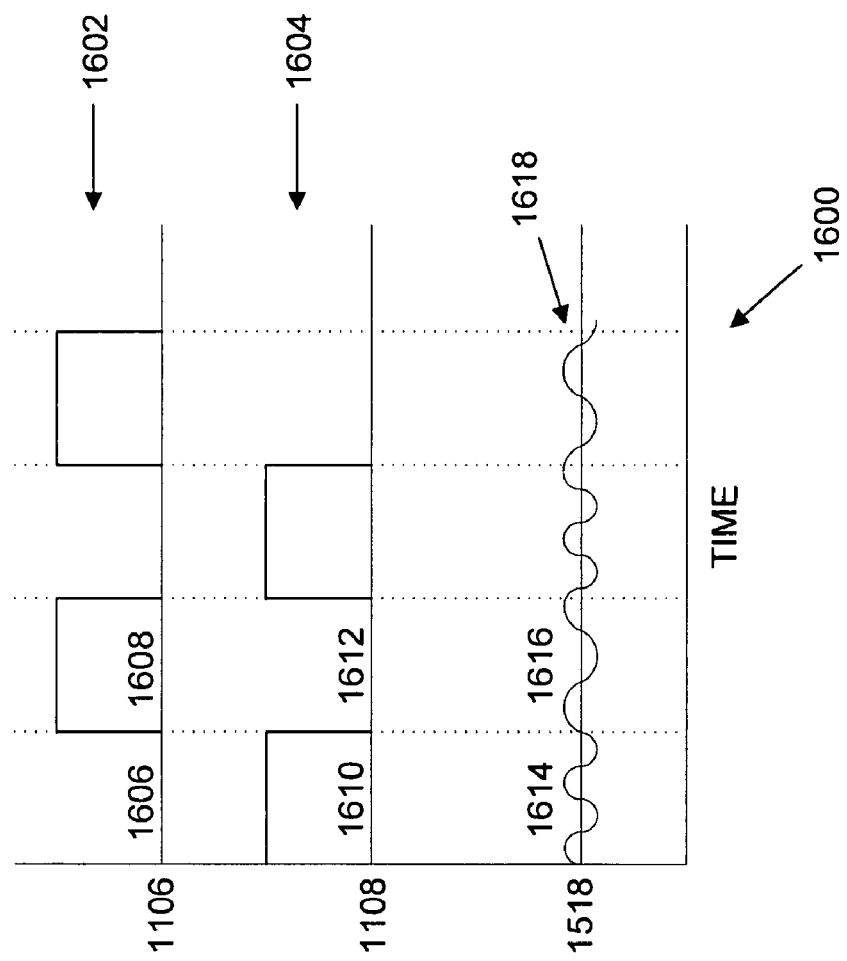
FIG. 16 is a graph corresponding to FIG. 15.

A graph 1600 shown in FIG. 16 further illustrates the operation of the plasmon multiplexer 1500. The first signal 1106 and the second signal 1108 are shown in FIG. 16 as square waves that are out of phase. The signals 1106, 1108 include segments 1608, 1610 that represent the signal 1106 or 1108 being on, and segments 1606, 1612 that represent the signal 1106 or 1108 being off.

In the embodiment in FIG. 15, when the first signal 1106 is off, corresponding to segment 1606, plasmon energy at the first frequency 1514 may pass through the first plasmon switch 1102 and propagate to the first transmission guide 1502. During this time the second signal 1108 is on, corresponding to segment 1610, and plasmon energy corresponding to the second frequency 1516 is inhibited from passing through the second plasmon switch 1104, and does not propagate to the first transmission guide 1502. Thus, a detector placed at the output 1518 detects plasmon energy at the first frequency 1514, corresponding to segment 1614 of the output wave 1618.

Conversely, when the first signal 1106 is on, corresponding to segment 1608, plasmon energy at the first frequency 1514 is inhibited from passing through the first plasmon switch 1102, and does not propagate to the first transmission guide 1502. During this time the second signal 1108 is off, corresponding to segment 1612, and plasmon energy corresponding to the second frequency 1516 may pass through the second plasmon switch 1104 and propagate to the first transmission guide 1502. Thus, a detector placed at the output 1518 detects plasmon energy at the second frequency 1516, corresponding to segment 1616 of the output wave 1618.

Figure 17:
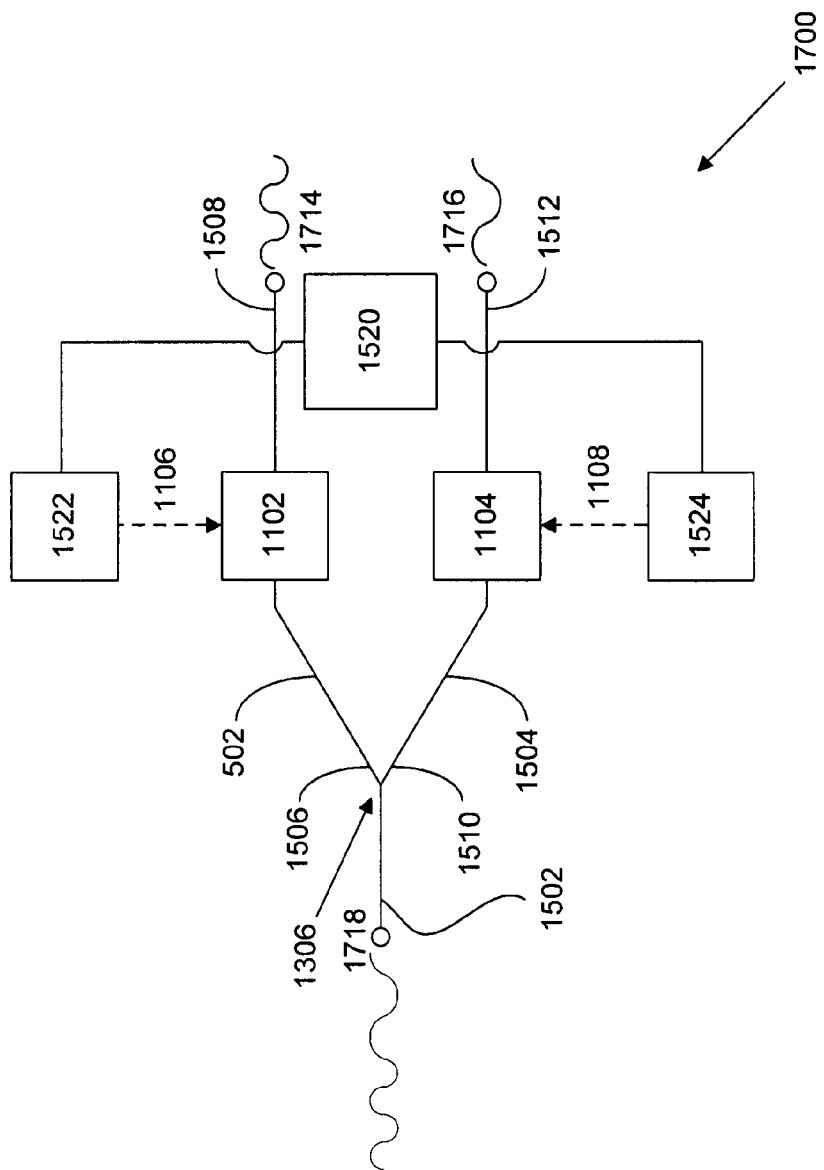
FIG. 17 is a schematic of a plasmon multiplexer.

A second embodiment of a plasmon multiplexer, a plasmon demultiplexer 1700, is shown in FIG. 17. It is similar to the embodiment shown in FIG. 15, except that the first plasmon guide 502 and the second plasmon guide 1504 are configured to join at a first intersection location 1306 and receive energy from the transmission guide 1502.

In one embodiment the multiplexer 1700 forms a system that includes circuitry 1520. The system may comprise a first energy generator 1522 and/or a second energy generator 1524 that produce control signals (the first and second signals 1106, 1108), where the energy generators 1522, 1524 may produce electromagnetic energy, plasmon energy, and/or a different kind of energy. The energy generators 1522, 1524 may produce square waves or one or more different waveforms.

Figure 18:
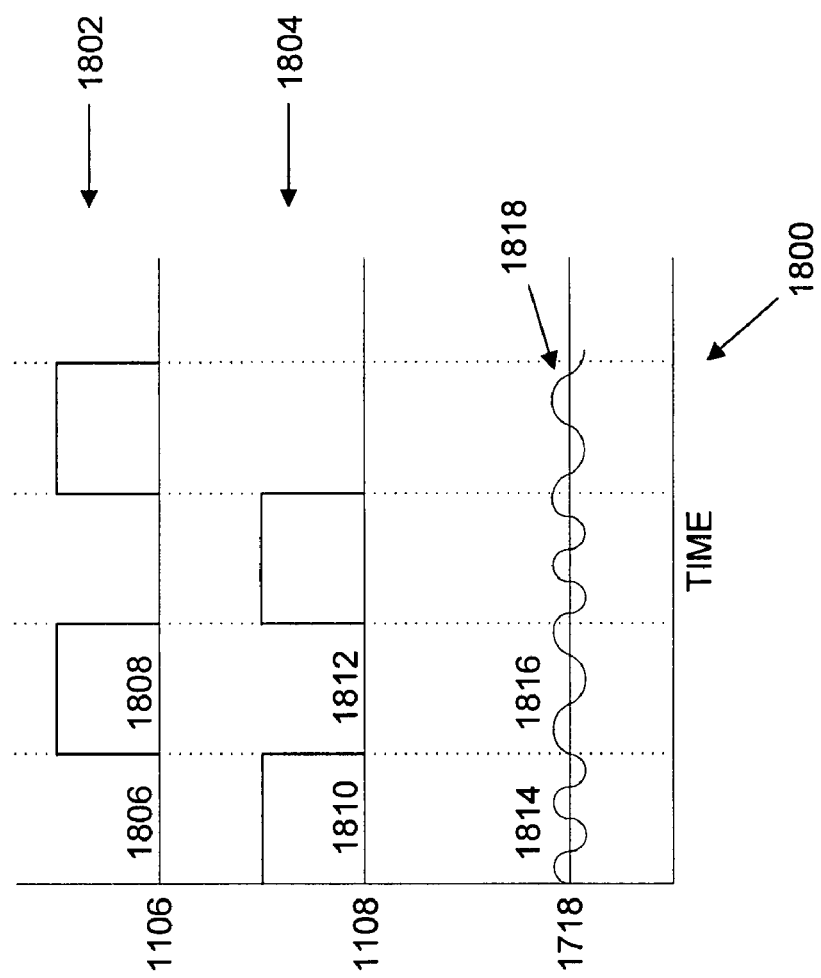
FIG. 18 is a graph corresponding to FIG. 17.

A graph 1800 shown in FIG. 18 further illustrates the operation of the plasmon demultiplexer 1700, where the demultiplexer 1700 is shown demultiplexing the transmission signal 1818, which, in this case is the same as the output wave 1618. The first signal 1106 and the second signal 1108 are shown in FIG. 18 as square waves that are out of phase. The signals 1106, 1108 include segments 1808, 1810 that represent the signal 1106 or 1108 being on, and segments 1806, 1812 that represent the signal 1106 or 1108 being off.

In the embodiment in FIG. 17, when the first signal 1106 is off, corresponding to segment 1806, plasmon energy from the transmission guide 1502 (the transmission signal 1818) may pass through the first plasmon switch 1102. Since segment 1806 of the first signal 1106 corresponds in time to segment 1814 of the transmission signal 1818, and the transmission signal 1818 is at the first frequency 1514 during this time, the output plasmon energy 1714 corresponds to plasmon energy at the first frequency 1514. During this time the second signal 1108 is on, corresponding to segment 1810 and plasmon energy corresponding to the second frequency 1516 is inhibited from passing through the second plasmon switch 1104, and does not propagate to the second output location 1512.

Conversely, when the first signal 1106 is on, corresponding to segment 1808, the transmission signal 1818 is inhibited from passing through the first plasmon switch 1102, and does not propagate to the first output location 1508. During this time the second signal 1108 is off, corresponding to segment 1812, and the transmission signal 1818 may pass through the second plasmon switch 1104. Since segment 1812 of the second signal 1108 corresponds in time to segment 1816 of the transmission signal 1818, and the transmission signal 1818 is at the second frequency 1516 during this time, the output plasmon energy 1716 corresponds to plasmon energy at the second frequency 1516.

Although the first and second signals 1106, 1108 are represented by square waves 1602, 1604, 1802, 1804 in FIGS. 16 and 18, in other embodiments they may be represented by different functions. Further, although the square waves 1602, 1604, 1802, 1804 are shown as being out of phase (for example, wave 1602 is shifted by Π radians relative to wave 1604), the waves may be phase shifted by any amount relative to one another.

Although the plasmon multiplexers 1500, 1700 are shown with two plasmon guides 502, 1504 and two plasmon switches 1102, 1104, other embodiments may include more than two guides 502, 1504 and/or more or fewer than two plasmon switches 1102, 1104. For example, an embodiment may include two guides and only one switch. A different embodiment may include three guides, each including a switch, where the guides may intersect at one or more locations. There are many configurations of guides and switches that may be assembled to form a multiplexer.

The plasmon multiplexers 1500, 1700 perform time-division multiplexing and demulitplexing as described above, however in other embodiments the type of multiplexing may be different. For example, the switches 1102, 1104 may be configured to frequency modulate incoming signals such that the two signals propagate simultaneously along the transmission guide 1502. Other types of modulation are known to those skilled in the art and may be applied to the multiplexing of plasmon signals.

Although multiplexing and demultiplexing are shown in different figures (FIGS. 15 and 17), some embodiments may include a multiplexer and a demultiplexer together.

Although FIGS. 15 and 17 include circuitry 1520, other embodiments of plasmon multiplexers may not include circuitry 1520. Further, although the circuitry is shown as being configured to send a signal to the first and second energy generators 1522, 1524, in other embodiments the circuitry 1520 may be functionally connected to other parts of the multiplexer to send and/or receive a signal. For example, the circuitry 1520 may be configured to receive a signal, not shown, that is indicative of the output from the first and/or second plasmon switch 1102, 1104. Or, the circuitry 1520 may be configured to receive a signal from a location external to the multiplexer. There are many other ways to configure circuitry 1520 relative to a multiplexer 1500 and/or 1700 and one skilled in the art may configure it in other ways than are described here.

In one embodiment a method comprises inputting a first plasmon signal including plasmon energy (for example, plasmon energy at the first frequency 1514), modulating the first plasmon signal 1514 to form a first modulated plasmon signal (not shown), and reversibly combining the first modulated plasmon signal and a second modulated plasmon signal (also not shown) to form a transmission signal (or output wave 1618).

Modulating the first plasmon signal 1514 may include passing the first plasmon signal 1514 in a first passing time interval 1606 and blocking the first plasmon signal in a first blocking time interval 1608. The method may further comprise modulating a second plasmon signal (for example, plasmon energy at the second frequency 1516) to form the second modulated plasmon signal (not shown), wherein modulating the second plasmon signal 1516 includes passing the second plasmon signal 1516 in a second passing time interval 1612 and blocking the second plasmon signal 1516 in a second blocking time interval 1610. The first passing time interval 1606 may corresponds substantially to the second blocking time interval 1610, and/or the first blocking time interval 1608 may correspond substantially to the second passing time interval 1612. Further, the second passing time interval 1612 may be substantially equal in magnitude to the second blocking time interval 1610, and/or the first passing time interval 1606 may be substantially equal in magnitude to the first blocking time interval 1608.

In one embodiment the method may comprise modulating the first plasmon signal 1514 at a first frequency and/or modulating the second plasmon signal 1516 at a second frequency to form the second modulated plasmon signal, where the first frequency may be different from the second frequency.

The method may further comprise modulating the transmission signal 1818 to form a first output signal (output plasmon energy 1714) and/or a second output signal (output plasmon energy 1716). The method may further comprise extracting the first and/or second modulated plasmon signal from the transmission signal 1818.

In one embodiment a method comprises, in a first time interval, selectively controlling plasmon energy to produce a first plasmon signal, directing the first plasmon signal along a first path (or transmission guide 1502) in the first time interval, and directing a second plasmon signal along the first path 1502 in a non-overlapping manner with respect to the first plasmon signal during the first time interval to produce a multiplexed plasmon signal. The second plasmon signal may be non-overlapping in frequency, time, and/or a different parameter with respect to the first plasmon signal.

Selectively controlling plasmon energy to produce a first plasmon signal may include receiving a signal 1106 and/or modulating plasmon energy to produce the first plasmon signal, where modulating plasmon energy to produce the first plasmon signal may include modulating the frequency of plasmon energy to produce the first plasmon signal. The method may further comprise selectively controlling plasmon energy to produce the second plasmon signal.

In one embodiment a method comprises modulating a first parameter of a first plasmon signal according to a first set of information, and spatially overlapping the first plasmon signal with a second plasmon signal in a manner that maintains modulation of the first parameter of the first plasmon signal, where the first parameter may be amplitude, frequency, and/or a different parameter.

Spatially overlapping the first plasmon signal with a second plasmon signal in a manner that maintains the modulation of the first parameter of the first plasmon signal may include interleaving in time the first and second plasmon signals and/or maintaining the frequency independence of the first and second plasmon signals.

Modulating a first parameter of a first plasmon signal according to a first set of information may include receiving the first set of information and/or generating the first set of information.

In one embodiment, a method comprises modulating a first parameter of a first plasmon signal in a first portion of a parameter space, modulating a second parameter of a second plasmon signal in a second portion of a parameter space, wherein the first portion of the parameter space is different from the second portion of the parameter space, and combining the first plasmon signal and the second plasmon signal to form a carrier signal.

The parameter space may correspond to frequency space and/or time space. Where the parameter space corresponds to frequency space, the first portion of the parameter space may correspond to a first frequency range and the second portion of the parameter space may correspond to a second frequency range.

The method may further comprise sending the carrier signal and/or demodulating the carrier signal to extract the first and second plasmon signals.

Figure 19:
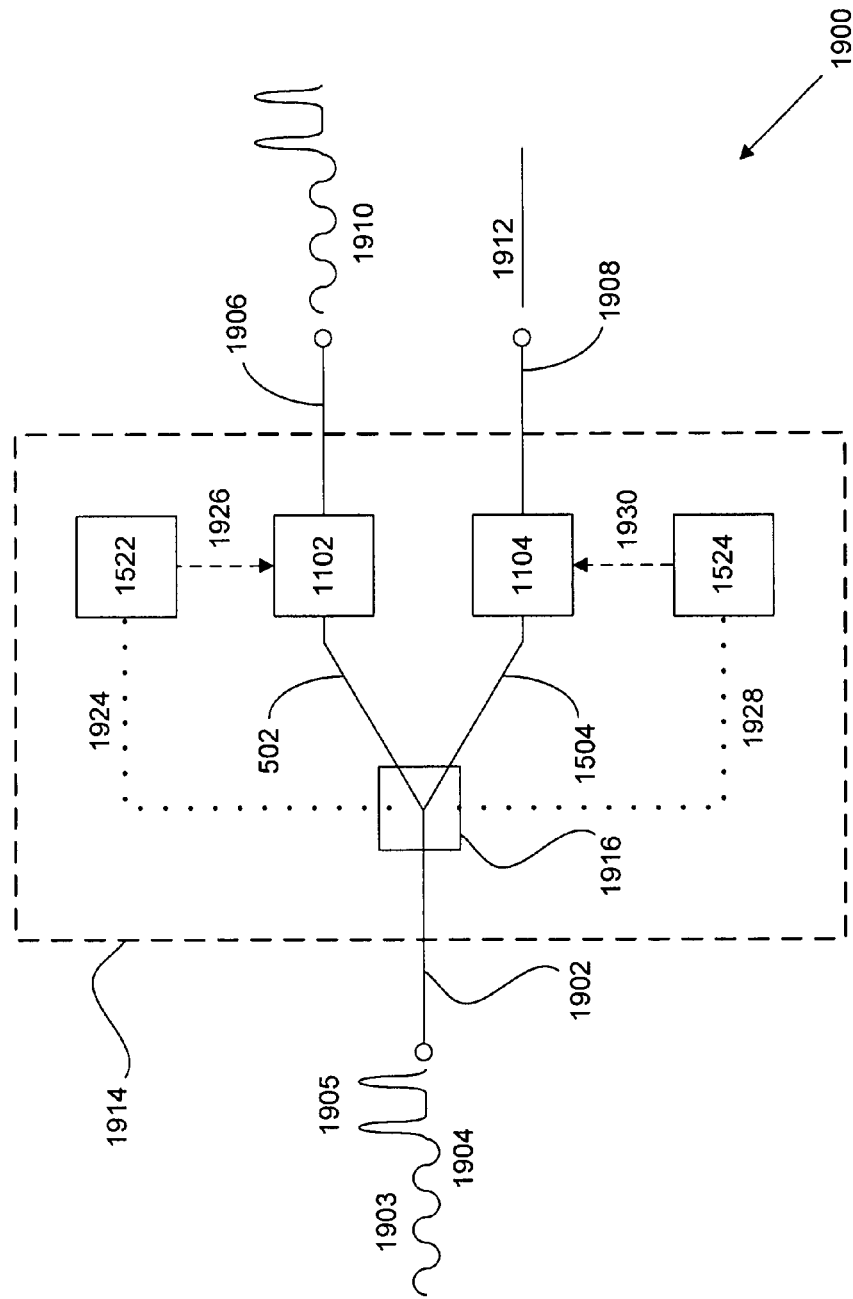
FIG. 19 is a schematic of a plasmon router.
Figure 20:
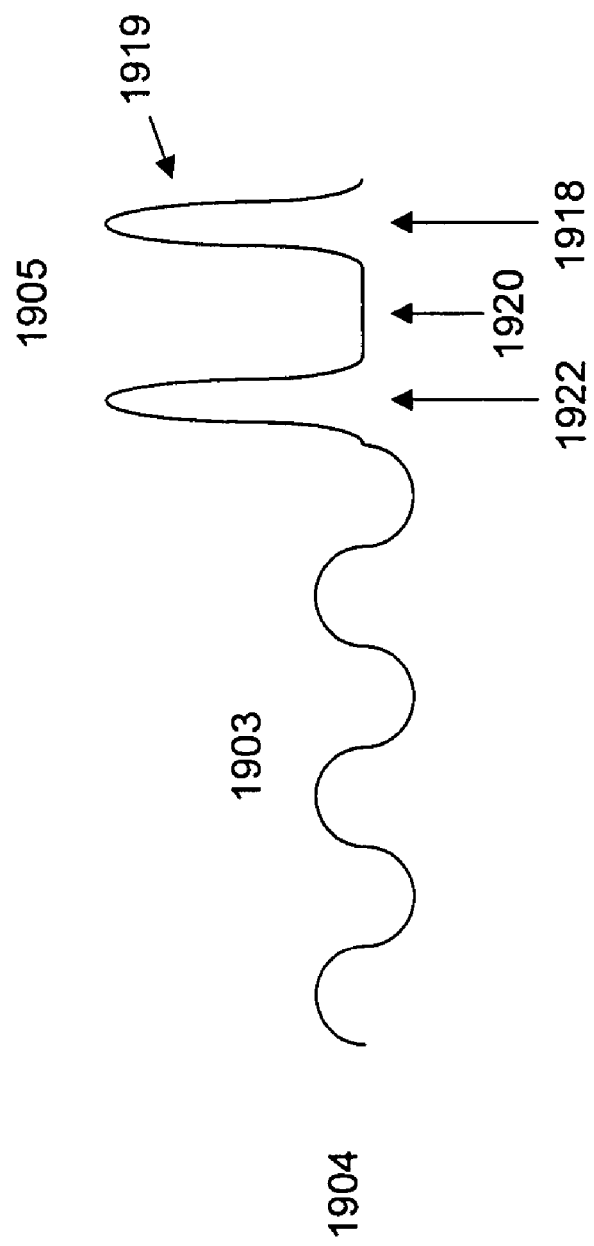
FIG. 20 is a schematic of a signal.

A first embodiment of a plasmon router 1900, shown in FIG. 19, comprises a first plasmon input port 1902 receptive to an input signal 1904 including plasmon energy, where the input signal 1904 is modulated to represent information represented as a packet in FIG. 20. As shown, the packet includes a carried information portion 1903 and a header portion 1905. Such packets may include additional information fields, such as parity bits, error correction information, housekeeping information, or other associated information.

The plasmon router 1900 further comprises a plurality of plasmon output ports 1906 and 1908 transmissive of output signals 1910 and 1912 including plasmon energy; and a control structure 1914 intermediate to the first plasmon input port 1902 and the plurality of plasmon output ports 1906, 1908. The illustrative control structure 1914 of FIG. 19 is configured to selectively direct plasmon energy to the plasmon output ports 1906, 1908 responsive to control signals such as signals 1924, 1926, 1928, and 1930, whose functions are detailed below. An element 1916 in the control structure 1914 is configured to detect a portion of the input signal 1904 and transmit the remainder of the signal along a first plasmon guide 502 and a second plasmon guide 1504.

The input signal 1904 is shown in detail in FIG. 20. The header 1905 includes three sections 1918, 1920, 1922, where the first section 1918 includes a pulse 1919 that forms the start of the signal 1904.

The second section 1920 determines whether a first electromagnetic signal 1926 is sent to the first plasmon switch 1102 via the first energy generator 1522. If a pulse is present in the second section 1920, a first electronic signal 1924 is sent to the first energy generator 1522, which generates the first electromagnetic signal 1926 that is incident on the first plasmon switch 1102, which saturates the switch 1102 and does not allow the plasmon signal 1904 to propagate through the switch 1102.

If a pulse is not present in the second section 1920, the first electronic signal 1924 is not sent to the first energy generator 1522 and the first electromagnetic signal 1926 is not incident on the first plasmon switch 1102, thus allowing the plasmon signal 1904 to propagate through the switch 1102. As discussed below, the embodiments herein are illustrative. For example, the operation of the illustrative plasmon switches 1102 in this configuration is described as being responsive to the presence of pulses in specific fields. However, the response may be more complex or simple. For example, the switch 1102 may be responsive to a determination of a pulse characteristic (e.g., amplitude, dispersion, etc.), threshold, or a more complex Boolean combination of pulses. Or an inverse of the approach may apply. For example, the switch may send the first electronic signal 1924 to the first energy generator 1522 in the absence, rather than presence of the pulse in the second section 1920.

In the embodiment in FIG. 19, the second section 1920 does not include a pulse, so the first electronic signal 1924 is not sent to the first energy generator 1522 and the first electromagnetic signal 1926 is not incident on the first plasmon switch 1102, and the input signal 1904 is allowed to propagate through the first plasmon switch 1102, shown diagrammatically as the output plasmon signal 1910.

The third section 1922 determines whether a second electromagnetic signal 1930 is sent to the second plasmon switch 1104 via the second energy generator 1524. If a pulse is present in the third section 1922, a second electronic signal 1928 is sent to the second energy generator 1524, which generates the second electromagnetic signal 1930 that is incident on the second plasmon switch 1104, which saturates the switch 1104 and does not allow the plasmon signal 1904 to propagate through the switch 1104.

If a pulse is not present in the third section 1922, the second electronic signal 1928 is not sent to the second energy generator 1524 and the second electromagnetic signal 1930 is not incident on the second plasmon switch 1104, thus allowing the plasmon signal 1904 to propagate through the switch 1104.

In the embodiment in FIG. 19, the third section 1922 does include a pulse, so the second electronic signal 1928 is sent to the first energy generator 1522 and the second electromagnetic signal 1930 is incident on the second plasmon switch 1104, and the input signal 1904 is not allowed to propagate through the first plasmon switch 1102, where the output plasmon signal 1912 is drawn as a straight line to indicate no plasmon signal.

In one embodiment the control structure 1914 includes processing circuitry, where the processing circuitry may include a microprocessor, electronic components, and/or routing logic. For example, the element 1916 may include a plasmon detector, not shown, configured to deliver a signal to a processor, also not shown, where the processor is configured to perform logic related to the plasmon signal 1904.

In one embodiment the control structure 1914 may include a memory. For example, where the element 1916 includes a processor (not shown), the processor may include a memory configured to store information related to signals sent or received by the plasmon router.

In one embodiment the plasmon router 1900 may include a delay structure, not shown, where the delay structure may be configured to delay plasmon energy along a path such as the first plasmon guide 502, the second plasmon guide 1504, or a different path. The delay structure may include a dielectric material selected to slow the propagation of a plasmon signal along a path, it may include a path that is elongated by forming the path into a loop or into a different configuration, or it may be a different structure.

The plasmon router 1900 may, in some embodiments, include a converter, not shown, where the converter may be configured to convert between plasmon energy and a different form of energy (for example, electromagnetic and/or electrical energy). A converter may be configured to convert the different form of energy to plasmon energy and/or a converter may be configured to convert the plasmon energy to a different form of energy.

The plasmon router 1900 shown in FIG. 19 includes two plasmon output ports 1906, 1908; however other embodiments may include more than two plasmon output ports. Further, although the plasmon router 1900 includes only a single input port 1902, other embodiments may include more than one input port.

Although the control structure 1914 in FIG. 19 includes an element 1916 that is described as including a plasmon detector and a processor configured to send one or more electrical signals, in other embodiments the control structure 1914 may function in a different way. For example, the signals within the control structure 1914 may all be optical signals and/or the control structure 1914 may be configured such that it does not include a processor.

The input signal 1904 is shown having a certain form as one exemplary embodiment. However, the signal may have a different form. For example, the signals within sections one, two, and three 1918, 1920, 1922 may have a different shape than is shown in FIGS. 19 and 20. The header 1905 may have a different form than that shown in FIGS. 19 and 20, or there may be no header 1905 and the input signal 1904 may be routed according to other information in the signal such as frequency.

Although the plasmon router 1900 is shown in FIG. 19 as either passing or blocking the plasmon signal 1904, in other embodiments the router 1900 may be configured to attenuate the signal 1904, pass only a portion of the signal 1904, or otherwise selectively pass and/or block the signal 1904.

Figure 21:
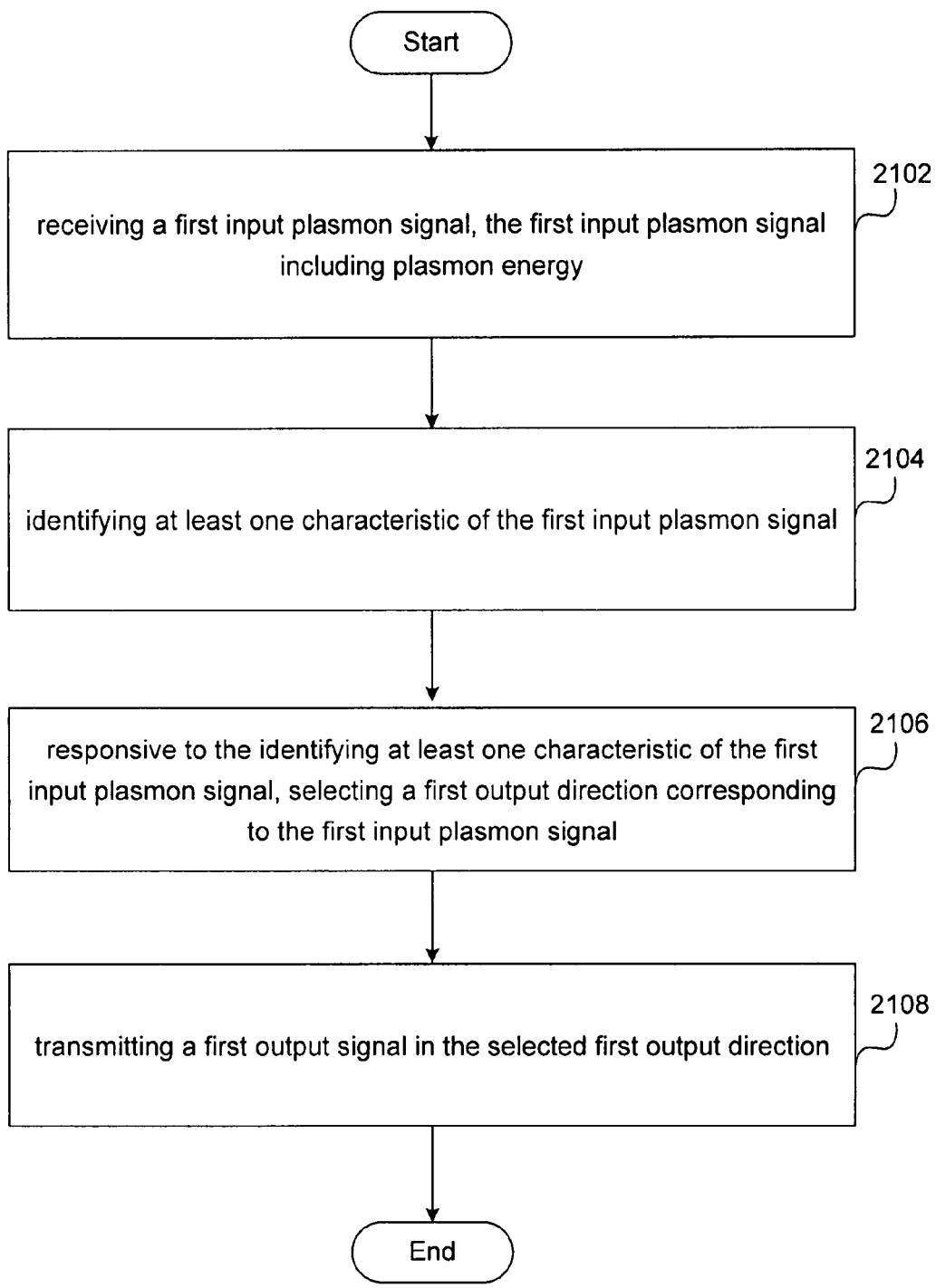
FIG. 21 is a flow chart depicting a method.

In one embodiment, a method shown in FIG. 21 comprises: (2102) receiving a first input plasmon signal, the first input plasmon signal including plasmon energy; (2104) identifying at least one characteristic of the first input plasmon signal (for example, information in a header portion 1905 of the signal); (2106) responsive to the identifying at least one characteristic of the first input plasmon signal, selecting a first output direction corresponding to the first input plasmon signal; and (2108) transmitting a first output signal in the selected first output direction.

Figure 22:
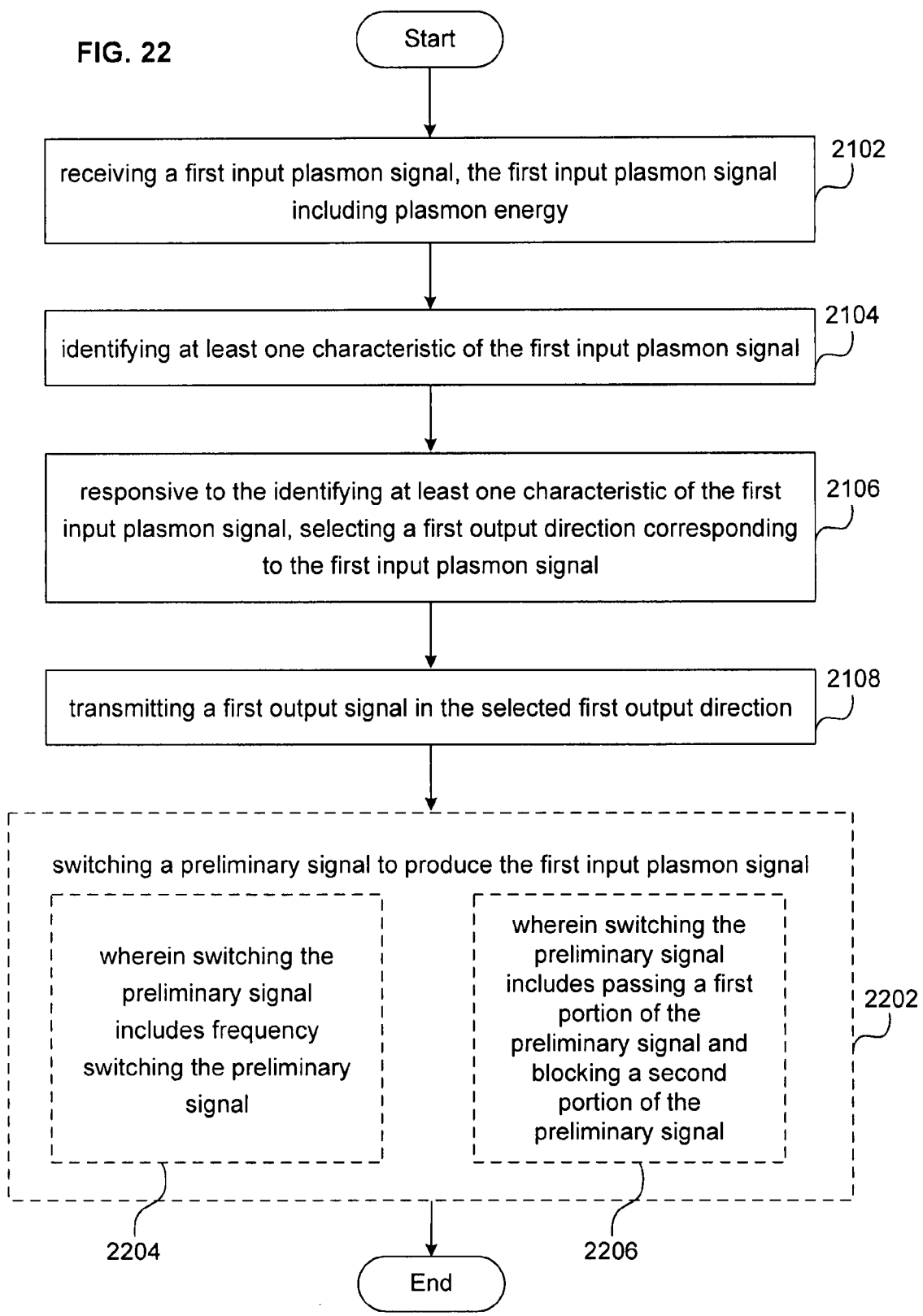
FIGS. 22-27 depict variants of the flow chart of FIG. 21.

The method may further comprise, as shown in FIG. 22, (2202) switching a preliminary signal to produce the first input plasmon signal, (2204) wherein switching the preliminary signal includes frequency switching the preliminary signal, and/or (2206) wherein switching the preliminary signal includes passing a first portion of the preliminary signal and blocking a second portion of the preliminary signal.

Figure 23:
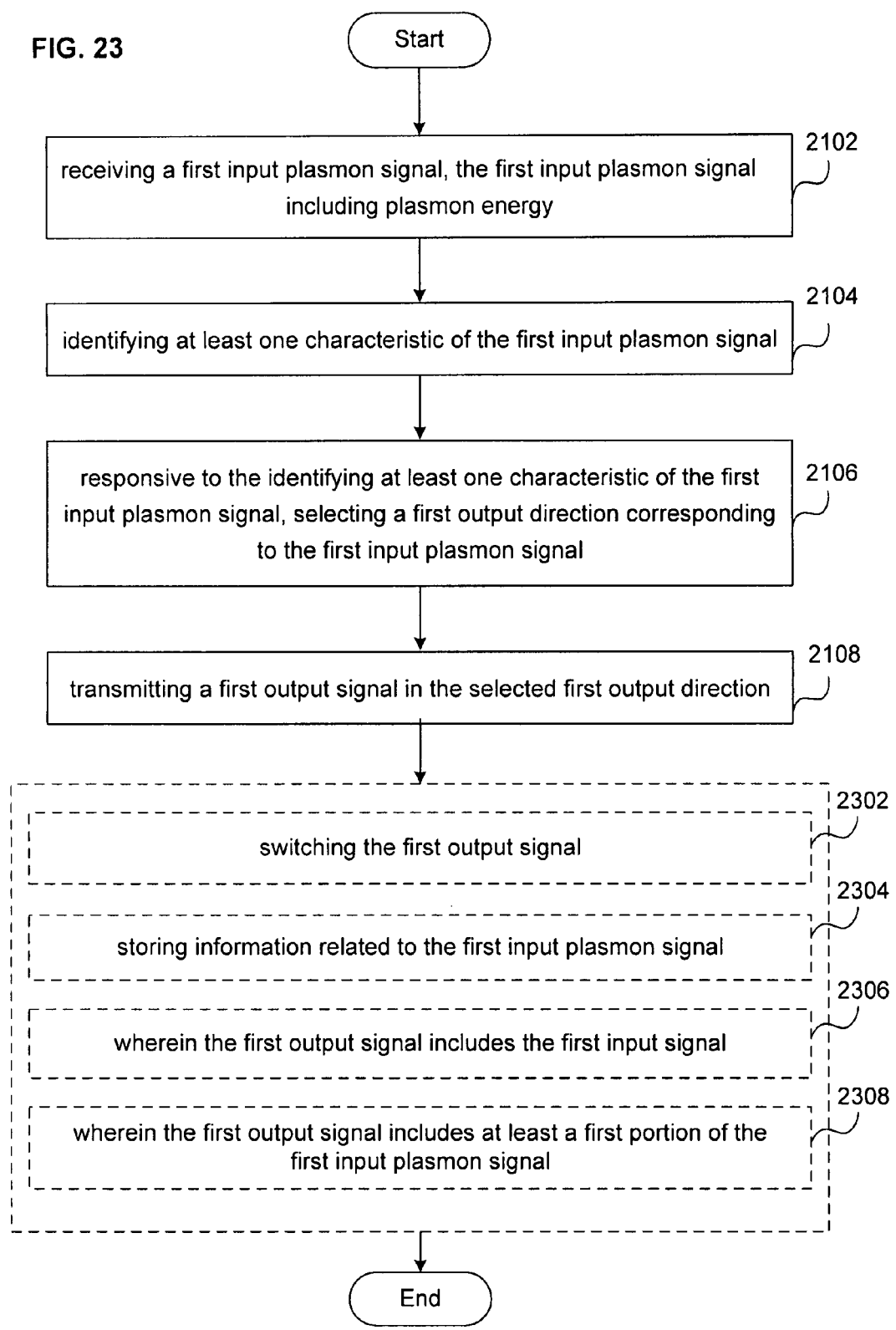

The method may further comprise, as shown in FIG. 23, (2302) switching the first output signal, and/or (2304) storing information related to the first input plasmon signal, where storing information related to the first input plasmon signal may include storing information such as amplitude and frequency electronically such as with software or in another way. In one case (2306) the first output signal includes the first input signal. In another case (2308) the first output signal includes at least a first portion of the first input plasmon signal.

Figure 24:
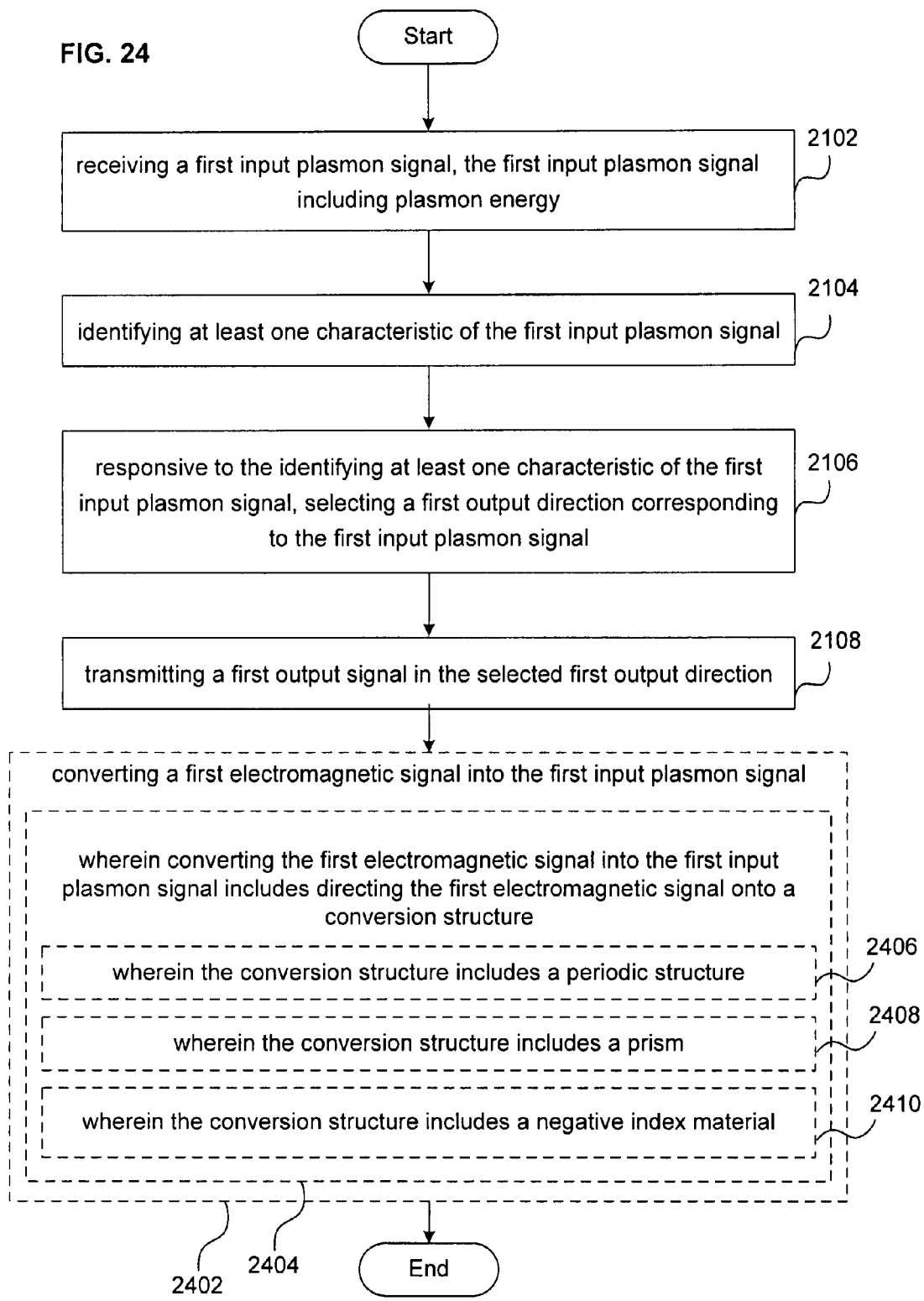

The method may further comprise, as shown in FIG. 24, (2402) converting a first electromagnetic signal into the first input plasmon signal, (2404) wherein converting the first electromagnetic signal into the first input plasmon signal includes directing the first electromagnetic signal onto a conversion structure, and (2406) wherein the conversion structure includes (2406) a periodic structure, (2408) a prism, and/or (2410) a negative index material.

Figure 25:
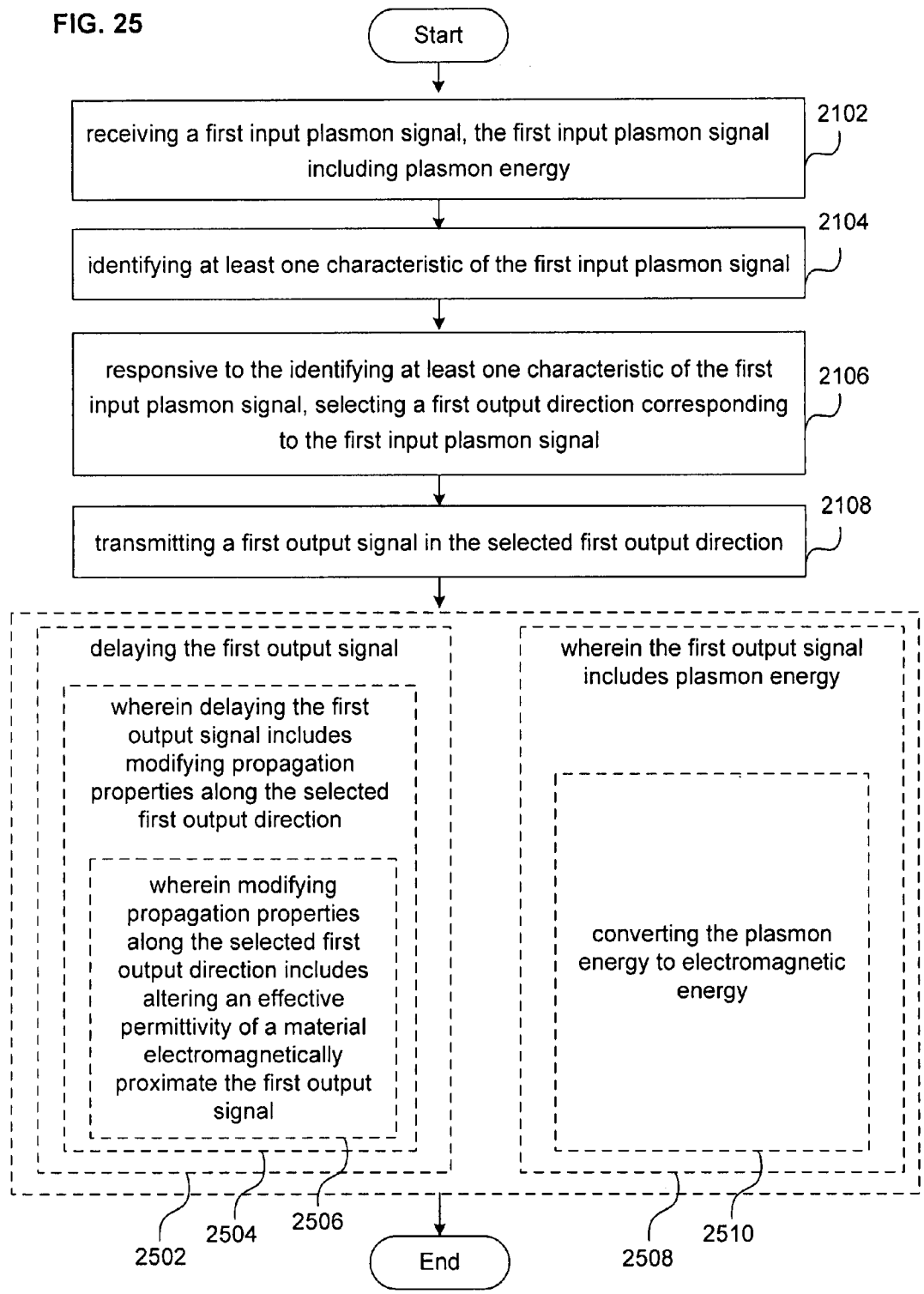

The method may further comprise, as shown in FIG. 25, (2502) delaying the first output signal, (2504) wherein delaying the first output signal includes modifying propagation properties along the selected first output direction, and (2506) wherein modifying propagation properties along the selected first output direction includes altering an effective permittivity of a material electromagnetically proximate the first output signal.

In one case, shown in FIG. 25, (2508) the first output signal includes plasmon energy, and the method may further comprise (2510) converting the plasmon energy to electromagnetic energy, where the conversion structure may include a periodic structure, a prism, a negative index material, or a different material or structure.

Figure 26:
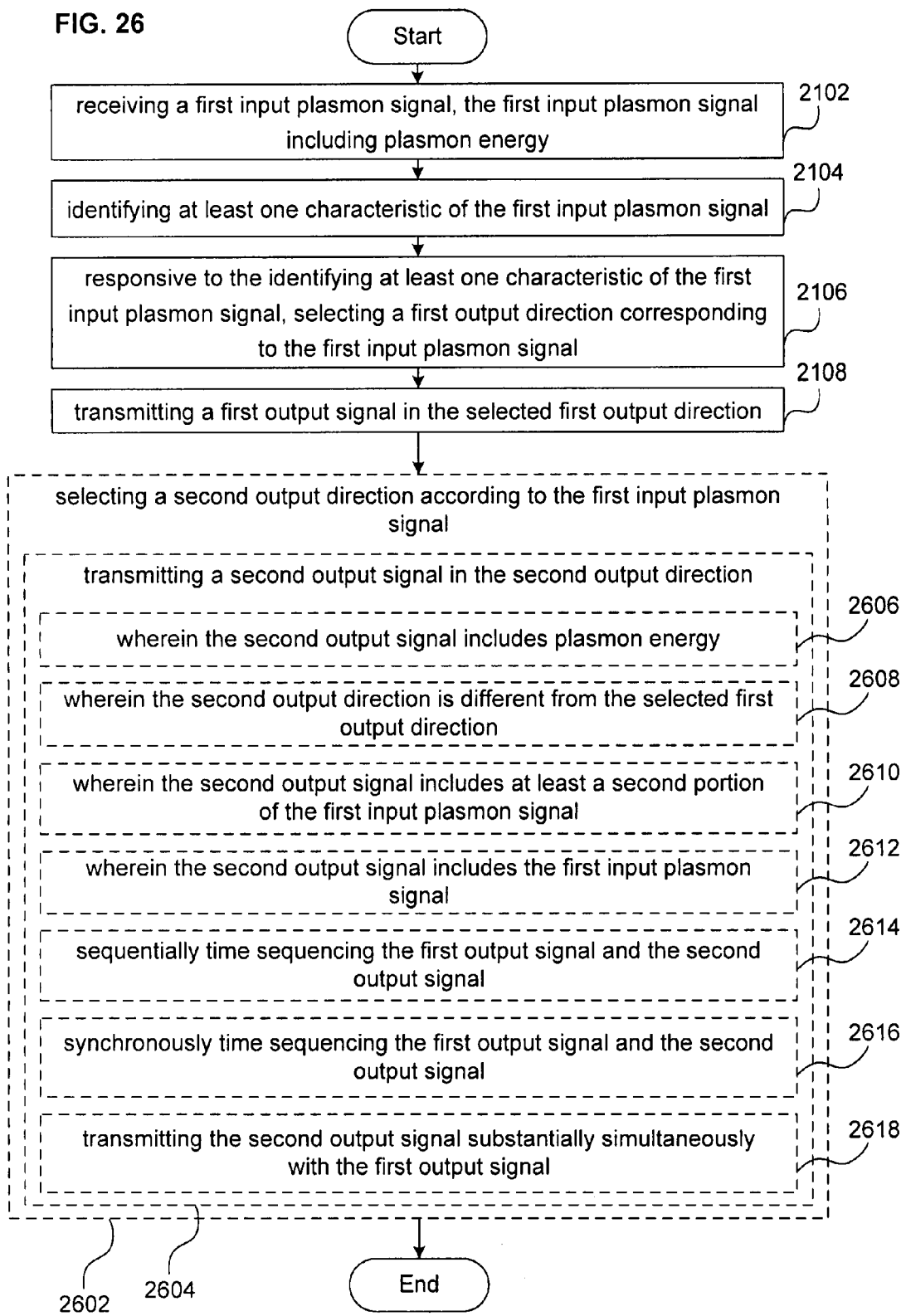

The method may further comprise, as shown in FIG. 26, (2602) selecting a second output direction according to the first input plasmon signal and (2604) transmitting a second output signal in the second output direction, (2606) wherein the second output signal includes plasmon energy, (2608) wherein the second output direction is different from the selected first output direction, (2610) wherein the second output signal includes at least a second portion of the first input plasmon signal, and/or (2612) wherein the second output signal includes the first input plasmon signal. The method may further comprise (2614) sequentially time sequencing the first output signal and the second output signal, (2616) synchronously time sequencing the first output signal and the second output signal, and/or (2618) transmitting the second output signal substantially simultaneously with the first output signal.

Figure 27:
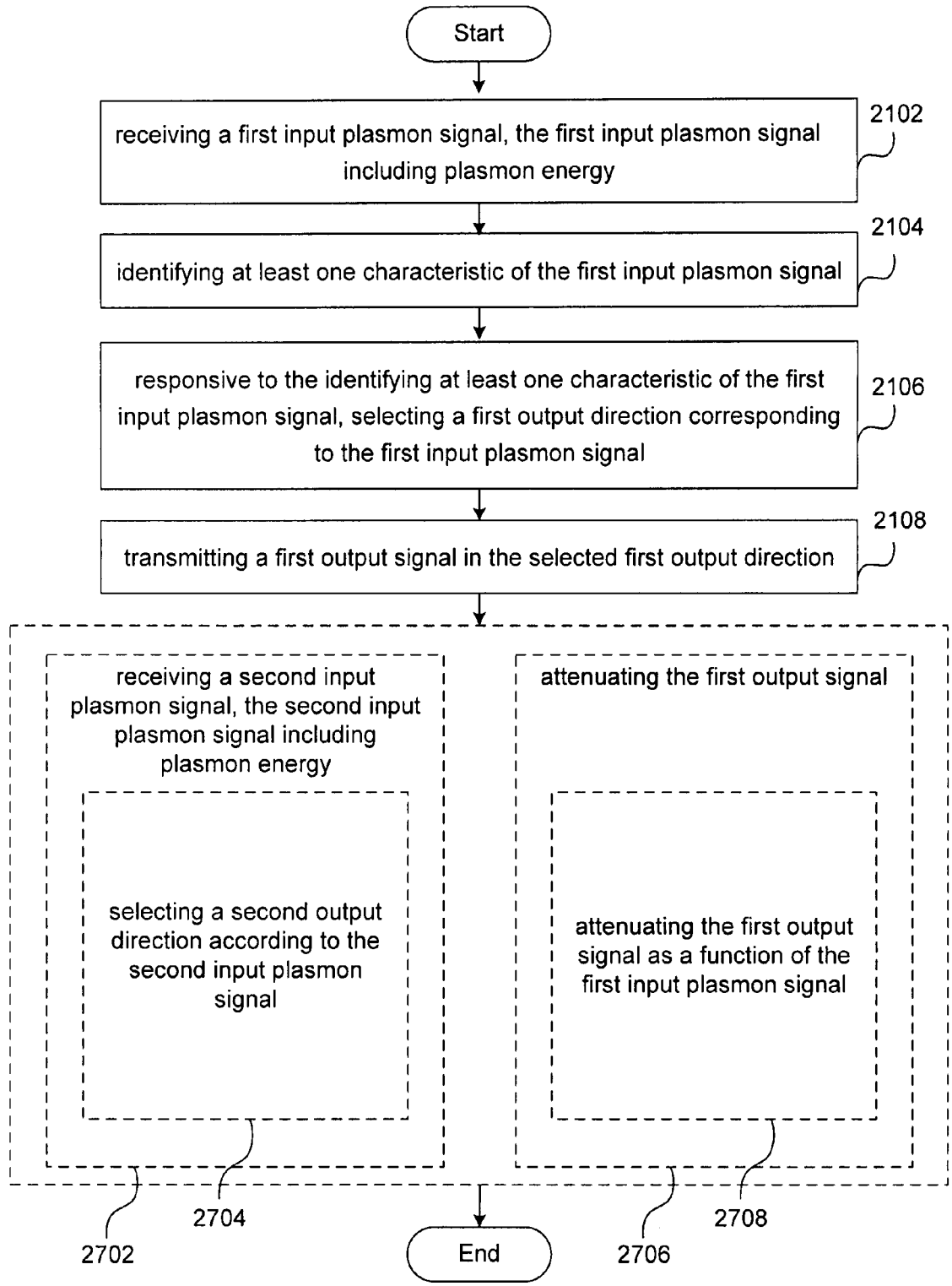

The method may further comprise, as shown in FIG. 27, (2702) receiving a second input plasmon signal, the second input plasmon signal including plasmon energy, and (2704) selecting a second output direction according to the second input signal. The method may further comprise (2706) attenuating the first output signal, and (2708) attenuating the first output signal as a function of the first input plasmon signal, where attenuating may include altering an effective permittivity of a material electromagnetically proximate the first output signal, propagating the plasmon signal along a path, or a different method.

Figure 28:
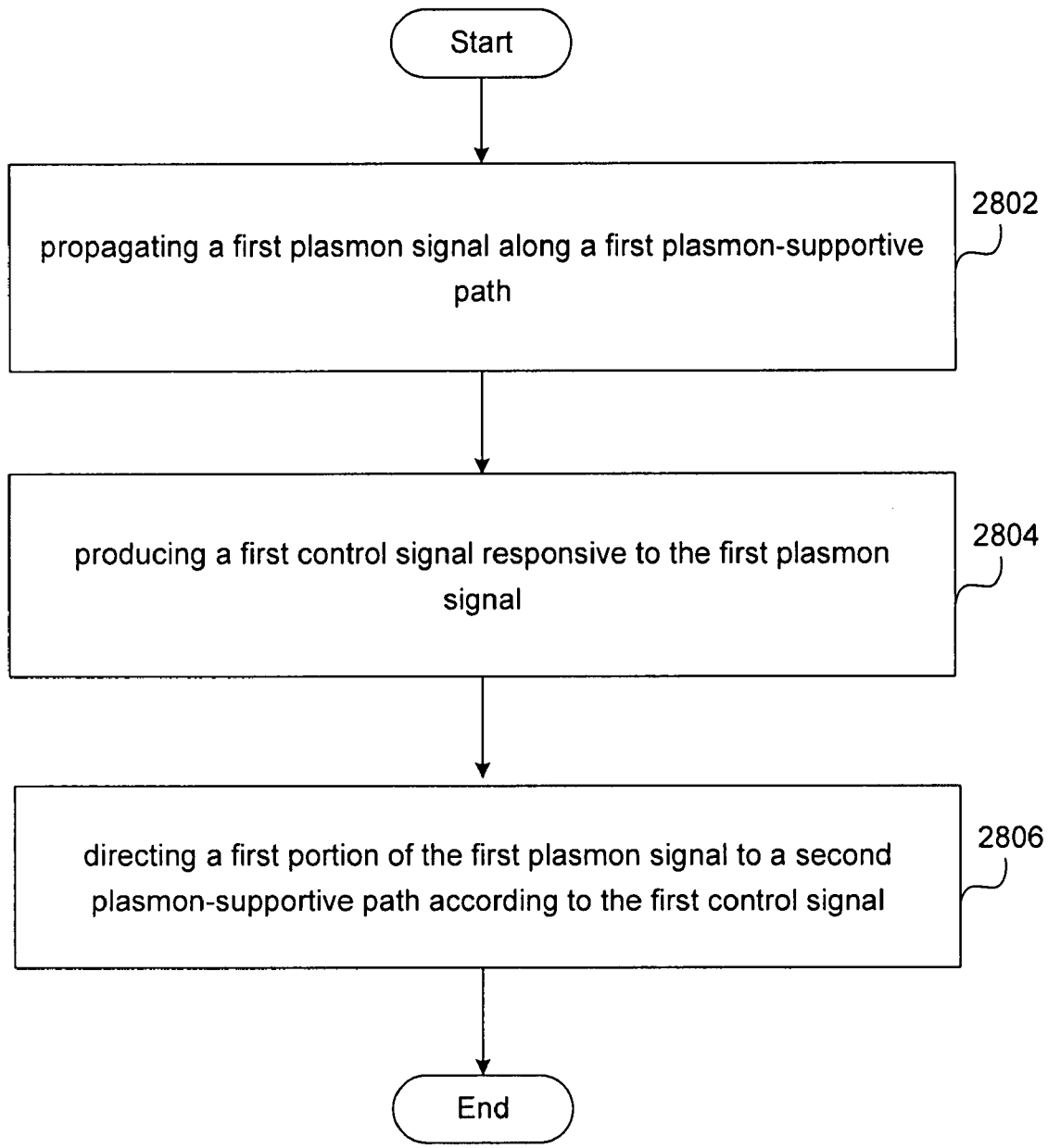
FIG. 28 is a flow chart depicting a method.
Figure 29:
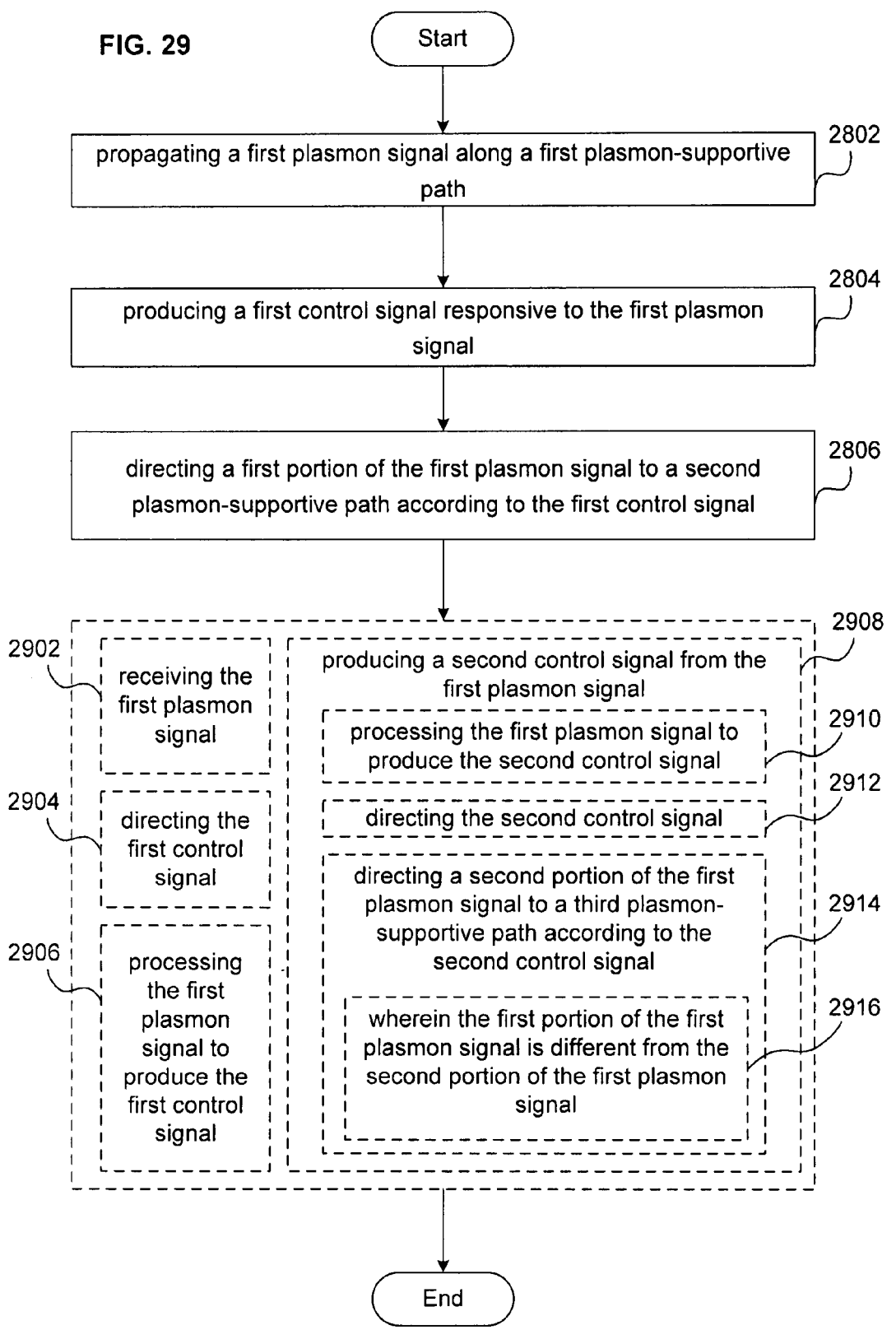
FIG. 29 depicts variants of the flow chart of FIG. 28.

In another embodiment, a method shown in FIG. 28 comprises: (2802) propagating a first plasmon signal along a first plasmon-supportive path (such as the first plasmon guide 502 shown in FIG. 5); (2804) producing a first control signal responsive to the first plasmon signal (such as the signals 1924, 1926, 1928, 1930); and (2806) directing a first portion of the first plasmon signal to a second plasmon-supportive path according to the first control signal.

The method may further comprise (2902) receiving the first plasmon signal, (2904) directing the first control signal (for example, directing the signal 1926 to the switch 1102 as shown in FIG. 19), (2906) processing the first plasmon signal to produce the first control signal, and/or (2908) producing a second control signal from the first plasmon signal. The method may further comprise (2910) processing the first plasmon signal to produce the second control signal and/or (2912) directing the second control signal. The method may further comprise (2914) directing a second portion of the first plasmon signal to a third plasmon-supportive path according to the second control signal, (2916) wherein the first portion of the first plasmon signal is different from the second portion of the first plasmon signal.

Figure 30:
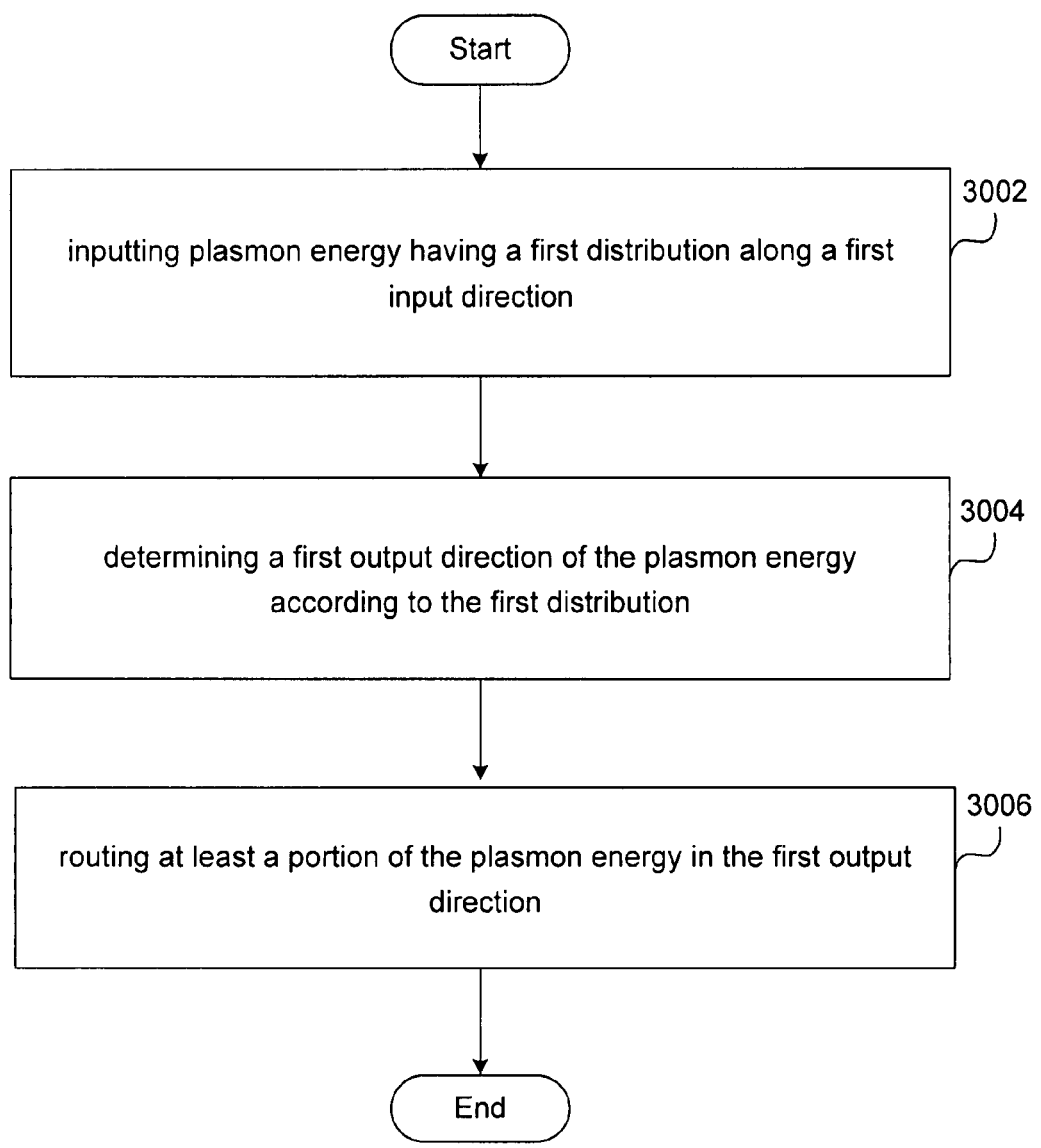
FIG. 30 is a flow chart depicting a method.

In another embodiment, a method shown in FIG. 30 comprises: (3002) inputting plasmon energy having a first distribution along a first input direction; (3004) determining a first output direction of the plasmon energy according to the first distribution, and (3006) routing at least a portion of the plasmon energy in the first output direction.

Figure 31:
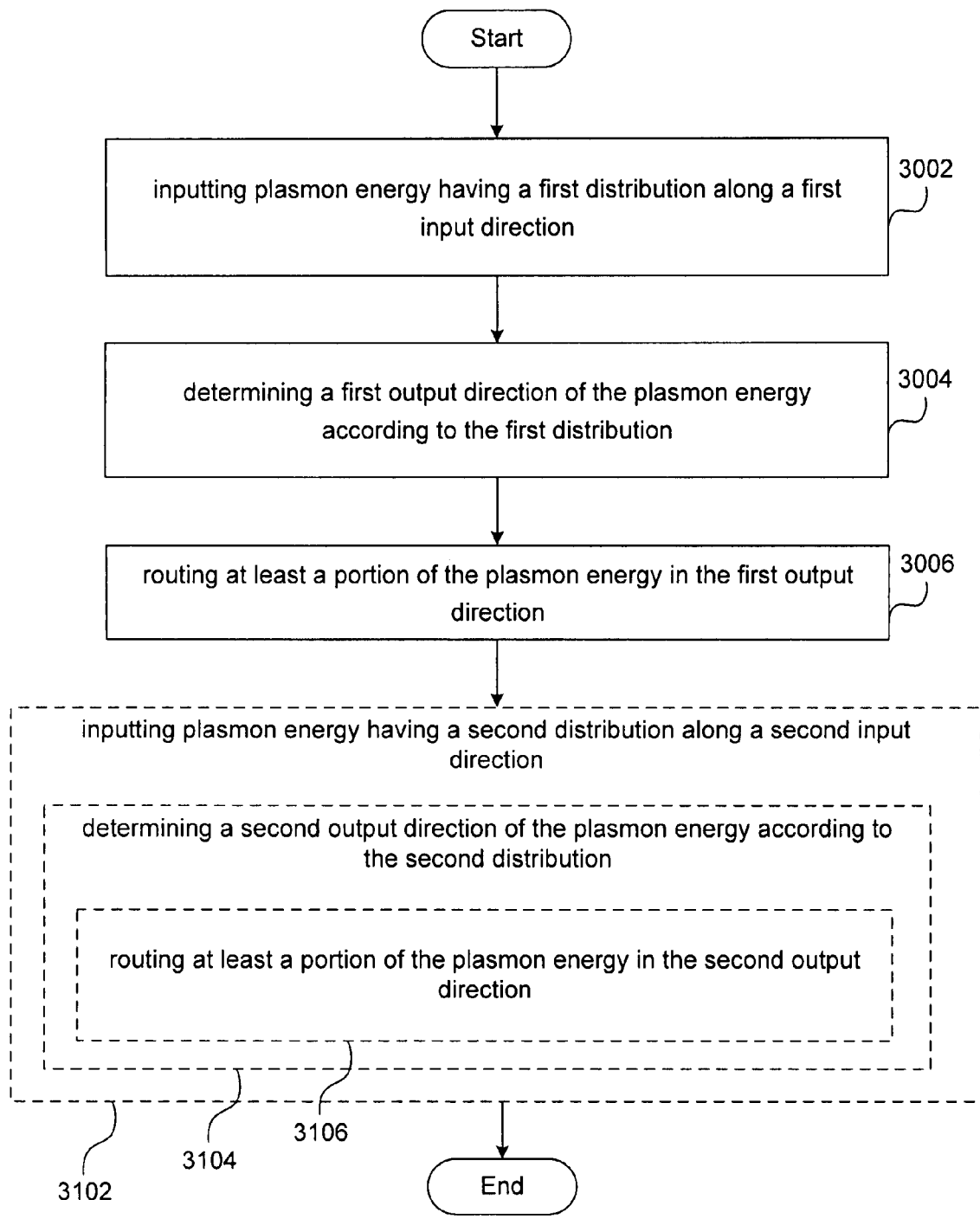

As shown in FIG. 31, the method may further comprise (3102) inputting plasmon energy having a second distribution along a second input direction, (3104) determining a second output direction of the plasmon energy according to the second distribution, and/or (3106) routing at least a portion of the plasmon energy in the second output direction.

As shown in FIG. 32, in one case, (3004) determining a first output direction of the plasmon energy according to the first distribution may include (3202) processing the plasmon energy, (3204) converting a portion of the plasmon energy to electrical energy, and/or (3206) converting a portion of the plasmon energy to electromagnetic energy. In one case, (3006) routing at least a portion of the plasmon energy in the first output direction may include (3208) supplying energy to a first plasmon switch and (3210) supplying energy to a second plasmon switch.

In this disclosure, references to "optical" elements, components, processes or other aspects, as well as references to "light" may also relate in this disclosure to so-called "near-visible" light such as that in the near infrared, infra-red, far infrared and the near and far ultra-violet spectrums. Moreover, many principles herein may be extended to many spectra of electromagnetic radiation where the processing, components, or other factors do not preclude operation at such frequencies, including frequencies that may be outside ranges typically considered to be optical frequencies.

Although FIGS. 1-32 show structures configured to transport energy over relatively short distances, in some embodiments structures may be configured to transport energy over very long distances of even thousands of kilometers or more. For example, referring to FIG. 10, an optical fiber may be configured to carry electromagnetic energy over a substantially large distance, and metal deposited on the fiber may convert energy from electromagnetic energy propagating in the fiber to plasmon energy propagating on the metal.

Applications of plasmons and logic systems including plasmons are wide ranging. For example, there may be situations, such as in optical fiber systems where all-optical switching is desired, where electromagnetic energy is converted to plasmons to do the switching and then converted back to electromagnetic energy.

Although the term "plasmon" is used to describe a state propagating at the boundary between two materials whose real parts of their dielectric constants $\in$ and $\in'$ have different signs, one skilled in the art may recognize that other terms may exist for this state, including, but not limited to, "surface plasmon" and/or "surface plasmon polariton".

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various embodiments described herein can be implemented, individually and/or collectively, by various types of electromechanical systems having a wide range of electrical components such as hardware, software, firmware, or virtually any combination thereof; and a wide range of components that may impart mechanical force or motion such as rigid bodies, spring or torsional bodies, hydraulics, and electro-magnetically actuated devices, or virtually any combination thereof. Consequently, as used herein "electromechanical system" includes, but is not limited to, electrical circuitry operably coupled with a transducer (e.g., an actuator, a motor, a piezoelectric crystal, etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical or other analogs. Those skilled in the art will also appreciate that examples of electromechanical systems include but are not limited to a variety of consumer electronics systems, as well as other systems such as motorized transport systems, factory automation systems, security systems, and communication/computing systems. Those skilled in the art will recognize that electromechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   receiving a first input plasmon signal, the first input plasmon signal including plasmon energy;
   identifying at least one characteristic of the first input plasmon signal;
   responsive to the identifying at least one characteristic of the first input plasmon signal, selecting a first output direction corresponding to the first input plasmon signal;
   transmitting a first output signal in the selected first output direction; and
   modifying propagation properties along the selected first output direction including altering an effective permittivity of a material electromagnetically proximate the first output signal.

2. The method of claim 1 further comprising switching a preliminary signal to produce the first input plasmon signal.

3. The method of claim 2 wherein switching the preliminary signal includes frequency switching the preliminary signal.

4. The method of claim 2 wherein switching the preliminary signal includes passing a first portion of the preliminary signal and blocking a second portion of the preliminary signal.

5. The method of claim 1 further comprising switching the first output signal.

6. The method of claim 1 further comprising delaying the first output signal.

7. The method of claim 6 wherein delaying the first output signal includes modifying propagation properties along the selected first output direction.

8. The method of claim 1 further comprising converting a first electromagnetic signal into the first input plasmon signal.

9. The method of claim 8 wherein converting the first electromagnetic signal into the first input plasmon signal includes directing the first electromagnetic signal onto a conversion structure.

10. The method of claim 9 wherein the conversion structure includes a periodic structure.

11. The method of claim 9 wherein the conversion structure includes a prism.

12. The method of claim 9 wherein the conversion structure includes a negative index material.

13. The method of claim 1 wherein the first output signal includes plasmon energy.

14. The method of claim 13 further comprising converting the plasmon energy to electromagnetic energy.

15. The method of claim 1 further comprising storing information related to the first input plasmon signal.

16. The method of claim 1 wherein the first output signal includes the first input plasmon signal.

17. The method of claim 1 wherein the first output signal includes at least a first portion of the first input plasmon signal.

18. The method of claim 1 further comprising receiving a second input plasmon signal, the second input plasmon signal including plasmon energy.

19. The method of claim 18 further comprising selecting a second output direction according to the second input plasmon signal.

20. The method of claim 1 further comprising attenuating the first output signal.

21. The method of claim 20 further comprising attenuating the first output signal as a function of the first input plasmon signal.

* * * * *